(12) United States Patent
Sprem et al.

(10) Patent No.: US 9,692,517 B1
(45) Date of Patent: Jun. 27, 2017

(54) WAVELENGTH TUNING OF FABRY-PEROT LASERS IN SPECTRUM-SLICED OPTICAL LINKS

(71) Applicants: Marko Sprem, Sesvete (HR); Dubravko Babic, Milpitas, CA (US)

(72) Inventors: Marko Sprem, Sesvete (HR); Dubravko Babic, Milpitas, CA (US)

(73) Assignee: University of Zagreb, Faculty of Electrical Engineering and Computing, Zagreb (HR)

( * ) Notice: Subject to any disclaimer, the term of this patent is extended or adjusted under 35 U.S.C. 154(b) by 0 days.

(21) Appl. No.: 15/450,325

(22) Filed: Mar. 6, 2017

Related U.S. Application Data

(63) Continuation of application No. 14/809,210, filed on Jul. 25, 2015, now Pat. No. 9,628,175.

(51) Int. Cl.
*H04B 10/2507* (2013.01)
*H04B 10/50* (2013.01)
*H04J 14/02* (2006.01)
*H04B 10/25* (2013.01)

(52) U.S. Cl.
CPC ....... *H04B 10/503* (2013.01); *H04B 10/2504* (2013.01); *H04J 14/02* (2013.01)

(58) Field of Classification Search
CPC .... H04B 10/503; H04B 10/2504; H04J 14/02
USPC .......................................................... 398/28
See application file for complete search history.

(56) References Cited

U.S. PATENT DOCUMENTS

| | | | |
|---|---|---|---|
| 7,593,647 B2 | 9/2009 | Lee | |
| 8,331,791 B2* | 12/2012 | Hong | ........... H04B 10/506 398/135 |
| 2009/0097507 A1* | 4/2009 | Zhu | ........... H01S 3/067 372/6 |
| 2010/0158524 A1* | 6/2010 | Kwon | ........... G02B 6/124 398/70 |

* cited by examiner

*Primary Examiner* — Don N Vo
(74) *Attorney, Agent, or Firm* — Shalini Venkatesh

(57) ABSTRACT

This application discloses apparatuses and methods for controlling a multi-longitudinal mode device seeded or wavelength locked to a spectrum-sliced external wavelength by either self-seeding or broadband light-source seeding through an array-waveguide grating.

7 Claims, 11 Drawing Sheets

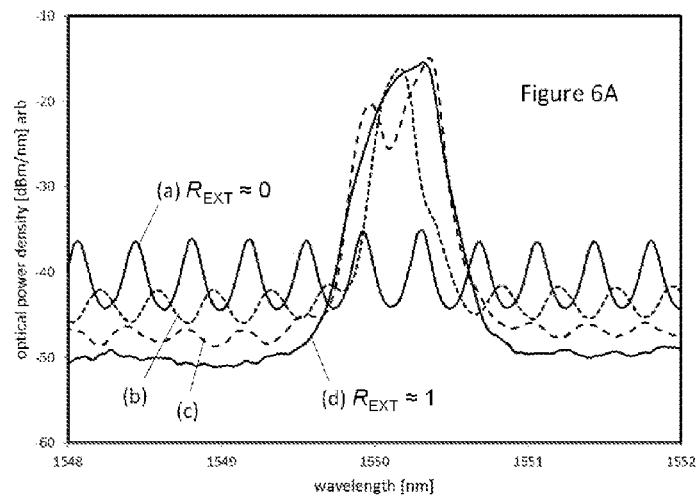
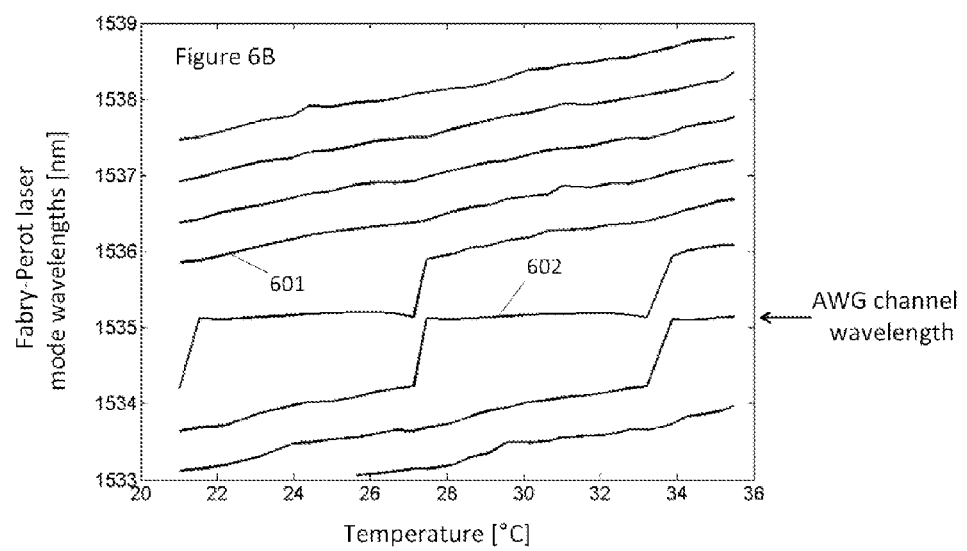

WAVELENGTH TUNING OF FABRY-PEROT LASERS IN SPECTRUM-SLICED OPTICAL LINKS

FIELD

The present document relates to the field of colorless passive-optical networks based on dense wavelength division multiplexing (WDM-PON), and more particularly to longitudinal-mode tuning at the client side of colorless WDM-PON based on broadband light source (BLS) seeding or self-seeding (SS). In particular, the application relates to optical transmitters that may be used, but are not limited to WDM-PON, and to WDM-PONs comprising such optical transmitters.

RELATED APPLICATIONS

This application is a continuation of U.S. patent application Ser. No. 14/809,210, entitled "Tunable transceivers for colorless spectrum-sliced WDM passive optical networks", filed on Jul. 25, 2015, which is hereby incorporated by reference, as if set forth in full in this specification.

BACKGROUND

Access networks are presently experiencing rapid growth around the world. Both residential and business customers are demanding increasingly higher bandwidths from their Internet service providers who in turn are pressed to implement networks capable of delivering bandwidths in excess of 100 Mb/s per customer. For this application, passive-optical-networks (PON) are particularly well suited as they feature lowest capital-equipment expenditures relative to point-to-point and active optical networks. The books by C. F. Lam, *Passive Optical Networks: Principles and Practice*, Academic Press, 2007, and by L. G. Lazovsky, N. Cheng, W-T. Shaw, D. Gutierrez, S-W. Wong, *Broadband Optical Access Networks*, Willey, 2011, and publication by C-H. Lee, W. V. Sorin, and B. Y. Kim, "Fiber to the Home Using a PON Infrastructure", *IEEE J. Lightwave Technol.*, vol. 24, no. 12, pp. 4568-4583, 2006 give good introduction into this technology.

A passive optical network allows a plurality of users to be connected to a node of a core network (for example, a metropolitan area network). A PON comprises an optical line termination (OLT) located at the central office (CO) and an optical distribution network (ODN) which comprises a plurality of optical links and passive optical components arranged so as to form a point-to-multipoint structure whose root is at the CO of the service provider. At its far end, each optical link may be terminated by a respective optical network unit (ONU). Namely, not all channels have to be terminated for the network to work. The ONUs may be located at user's premises and depending on the location of the optical link end one differentiates Fiber To The Home (FTTH), Fiber To The Building (FTTB), or Fiber To The Curb (FTTC), all commonly referred to as Fiber To The X (FTTX).

In a WDM PON, each ONU communicates with the OLT by using a respective pair of wavelengths: an upstream wavelength for data transmission from the ONU towards the CO and a downstream wavelength for data transmission from CO to the ONU. The wavelengths are generally located on a frequency grid specified by the International Telecommunications Union, in this case Recommendation ITU-T G.694.1. One possible arrangement is that the upstream wavelengths are located in the ITU C band (1531-1570 nm) and the downstream wavelengths are located in the ITU L band (1571-1611 nm). Other possibilities, in which downstream wavelengths are in the E band (1371-1470 nm), for example, are also possible, depending on the specific manufacturer or service provider's use of the installed fiber base. The density of wavelength in the band is specified by the grid frequency separation and the ITU-T G.694.1 recommendation currently specifies 12.5 GHz, 25 GHz, 50 GHz, and 100 GHz grid, with even larger frequency separations, such as 200 GHz are possible and have been used. The grid separation indirectly determines the constraints on the transmitters and receivers used in the OLT/ONU.

The optical components at the ONU end and possibly at the OLT end are fiber-optic transceivers: small packaged optical-electronic modules that are used to simultaneously transmit and receive optical signals at two different wavelengths. Every transceiver comprises optical components detect and generate optical signals, and the electronics to convert these signals to/from digital data stream incoming from network processors. Optical transceivers generally use connectors to mate to optical fibers that provide and take away optical signals. When optical signals coming to the transceiver and being transmitted from the transceiver are encoded on different wavelength, i.e., upstream wavelength different from downstream wavelength, a single fiber and fiber connector is often used. Such transceiver include a duplexer which separates the upstream from the downstream traffic.

In a WDM passive optical network, the ODN typically comprises a "remote node", a feeder optical fiber connecting the remote node to the OLT and a number of distribution optical fibers connecting the remote node to individual ONUs. The feeder fiber lengths vary depending on the service provider's architecture demands and ranges from 20 km to 80 km. The distribution fibers typically have a length ranging from some tens of meters to several kilometers, depending on the environment (metropolitan or rural) and on the application (FTTX). In the attempt to maintain the access network inexpensive, the remote node is typically kept passive so that no separate power supplies need to be installed to power provided to maintain the network. This means that the remote node contains only passive components.

The function of the remote node is to multiplex and demultiplex WDM signals: The upstream signals from all the OLTs, each with its own frequency are combined at an array-waveguide grating in the remote node into a single fiber where all the signals coexist, but are encoded on amplitude modulated signals at different wavelengths. The typical number of different wavelengths that can be fit into a specific ITU band depends on the frequency separation (grid). Typical numbers M for commercial array waveguide gratings are 16 for 200 GHz, 32 for 100 GHz, 40, and 48 for lower separations. At the other end of the network, the array waveguide grating demultiplexes the WDM signal into M signals at different wavelengths and routes these signals to M transceivers.

Array-waveguide grating (AWG) is ubiquitous in optical networking and is used for filtering, separating, combining, and routing signals of different wavelengths as is well known in the art. Its use and principle of operation is described in publicly available texts, such as, "WDM Technologies: Passive Optical Components" by A. K. Dutta, N. K. Dutta, and M. Fujiwara, published by Academic Press in 2003. It is well known in the art today that AWG temperature variation can be efficiently compensated by using so-called athermal array-waveguide gratings. This technology is described in publicly available texts such as "Recent Progress on Athermal AWG Wavelength Multiplexer" by Shin Kamei published at the Optical Fiber Communications conference in San Diego, Calif. in 2009.

Wavelength division multiplexing in passive optical networks (WDM-PON) is one of the actively investigated as next-generation optical network architecture. WDM-PON provides higher bandwidth per user than any other network architecture and hence potentially offers the lowest cost per unit of bandwidth to the user. However, the key difficulty in such a system has been the cost of the components, particularly arising from the need to transmit light at one wavelength for a specific channel and also receive information at any one of several other wavelengths at the user end in the so-called optical network unit (ONU). WDM optical and optoelectronic components traditionally exhibit high cost, among other issues, due to precise wavelength definitions in such systems. A dramatic cost reduction is achieved by eliminating wavelength-specific transceivers at the ONU in the colorless WDM-PON system, also referred to as a system with wavelength-agnostic transceivers in the ONU.

In a colorless optical network, the wavelengths emitted and received by the transceiver in the ONU are defined in the remote node or the CO rather than in the transceiver at the ONU as is well known in the art—see book by C. F. Lam cited above. One commonly implemented architecture uses a broad-band light source (BLS) to provide spectrally-sliced spontaneous emission to injection-lock to a longitudinal mode of the gain and modulation chip (GMC) as described in the book by L. G. Kazovsky cited above. This solution, however, suffers from high cost of the broadband light source. Further reduction in complexity and cost can be realized by using a self-seeding scheme as described in a publication by E. Wong, K. L. Lee, T. B. Anderson, "Directly Modulated Self-Seeding Reflective Semiconductor Optical Amplifiers as Colorless Transmitters in Wavelength Division Multiplexed Passive Optical Networks", *IEEE J. Lightwave Technol.*, vol. 25, no. 1, pp. 67-74 (2007).

This self-seeding technique, also referred to as self-tuning technique by some authors, relies on locking the GMC emission to a wavelength specified externally by spectrally slicing the spontaneous emission from the GMC itself, i.e., on injection self-locking. Spectral slicing refers to filtering the GMC spontaneous emission and returning it to the GMC for amplification. If the round-trip loss of the external cavity formed by the GMC, the fiber, and the external mirror is smaller than the unsaturated gain available in the GMC (at given current), lasing threshold will be reached. Above threshold all the additional current fed into the GMC will be converted into light at the emission wavelength, while spontaneous emission at wavelengths other than the selected emission wavelength will be reduced due to gain clamping. Resonators with such long cavities (several kilometers) behave like lasers in that they exhibit clear threshold in the light-current characteristic, but the linewidth and noise of the emitted light are governed by spectral slicing (filtering at the array-waveguide grating) and by thermal nature of the spontaneous emission.

A colorless WDM-PON architecture based on self-seeding is illustrated with the help of FIG. 1 (PRIOR ART). FIG. 1 shows the network components connected into a network 100 comprising a central office 101, feeder fiber 111, remote node 109, distribution fiber 103, and ONU transceiver 104. The central office 101 may comprise, in one location, the components from the remote node 109 and the components from transceiver 104 connected with some small length of optical fiber instead of the distribution fiber 103. In other words, the central office may be a mirror image of the components used on the client side with the difference that the wavelengths emitted from the central office 101 (all the downstream wavelengths $\Sigma\lambda_D$) are different from the upstream wavelengths $\Sigma\lambda_U$. The upstream may be located in the C-band, while the downstream may be in L-band.

The remote node 109 comprises an array-waveguide grating 116 with M distribution ports 108 and one common port 112. One of the distribution ports is connected to a distribution fiber 103 for illustration. The common port 112 of the AWG 116 is connected to a 45° Faraday Rotator and a mirror, i.e., a Faraday Rotating Mirror configured to reflect a portion of the spectrally sliced spontaneous emission coming from all the transceivers connected to the distribution ports 108, and transmit a portion to the feeder fiber 111 through a semi-transparent mirror 114. This type of arrangement is published by F. Saliou, P. Chanclou, B. Charbonnier, B. Le Guyader, Q. Deniel, A. Pizzinat, N. Genay(1), Z. Xu, H. Lin titled "Up to 15 km Cavity Self Seeded WDM-PON System with 90 km Maximum Reach and up to 4.9 Gbit/s CPRI Links" in ECOC 2012 Technical Digest, paper We.1.B.6.

It is also possible to use an optical coupler to let a portion of energy passing from the AWG 116 to the trunk fiber and portion to a high-reflectivity Faraday Rotating Mirror in the other branch of the optical coupler. This is not shown in FIG. 1, but is published by Q. Deniel, F. Saliou, P. Chanclou, D. Erasme, titled "Self-Seeded RSOA based WDM-PON Transmission Capacities" in the Technical Digest of the 2013 NFOEC/OSA Conference, paper OW4D.3.

The transceiver connected to the distribution fibers typically comprise a duplexer 110 which separates the upstream and the downstream traffic by directing the downstream optical traffic to the detector and trans-impedance amplifier 124, while the light emitted from the gain and modulation chip 105 passes through a Faraday Rotator 115 before reaching the duplexer 110 and being emitted into the distribution fiber 103. The GMC 105 is a chip with two facets 107 and 125 in which the back facet 107 exhibits high reflectivity coefficient and the front facet 125 a very low reflectivity coefficient. It is also common to curve the GMC waveguide at the point where it reaches the chip edge to reduce the reflectivity of facet 125 even further. In addition, the light passing through the high-reflectivity back-facet reflector 107 is generally coupled to a monitor photodiode and its signal is used to automatically control the output power of the GMC chip. The upstream and downstream digital data transmission are processed in the digital chip 126, in the figure referred to as PHY for physical media adapter. Digital data is encoded into the optical signals by modulating the gain of the GMC 105 using an electrical signal connected to the PHY chip 126. Amplitude modulation means that the symbols are encored into the amplitude of the light being transmitted, such as, low and high power, where the intensity of the output beam is modulated between two values per bit or pulse amplitude modulation (PAM) where more than one power level is used to encode information. Note that duplexer is commonly referred to as a diplexer in the industry. The term diplexer refers to a frequency multiplexer with two frequencies in which two signals of different frequencies travel in the same direction, whereas the term duplexer comes from "full duplex communication" meaning simultaneous bidirectional signal flow over a single path, which is also realized with two different frequencies. Diplexer and duplexer are generally passive reciprocal devices and hence may physically be identical. For the purposes of this application, the term diplexer has the same meaning as the term duplexer.

The principle of light generation involves broadband spontaneous emission generated and intensity modulated by the gain and modulation chip 105 (GMC) which is emitted towards the remote node 109 via the distribution fiber 103. The spontaneous emission is filtered in the AWG 116 and light around a narrow linewidth around one wavelength $\lambda_U$ is passed through to the Faraday Rotating Mirror 113/114. The reflector 114 reflects a portion of the incident light back towards the AWG 116 and finally to the GMC 105 via the distribution fiber. The existence of two Faraday Rotators 113 and 115 removes the birefringence in the path of the light between the remote node and the transceiver. Transceiver 104 often is equipped with a heater 120 which is used to increase the temperature of the GMC to broaden and shift the gain spectrum of the GMC.

At present time, there is no commercial deployment of self-seeded WDM-PON as described above. Numerous technical issues have prevented this. The main difficulties can be enumerated as originating form (a) the presence of residual modulation in the seeding light which reduces the link margin, (b) link instability originating from random and time-dependent birefringence of the fibers and components and the high degree of polarization sensitivity of the gain medium, (c) noise inherent in the spectrally sliced light, and (d) large linewidths of the emitted light causing large dispersion penalty.

In addition to the above-mentioned network architecture-related issues, there is a device-related issue that is present today and will be become more so a problem in the future development of WDM-PON systems based on BLS-seeding and self-seeding when channel density increases: It is related to the matching of the longitudinal modes of the GMC 105 to the channel of the AWG 116. Namely, the channel wavelength of an athermal AWG 116 is very temperature stable (~2 pm/° C.), while the longitudinal modes of semiconductor lasers or amplifiers used in GMC 105 are significantly more temperature sensitive; they move at ~100 pm/° C. For all ambient temperatures of the remote node 109 and the transceiver 104 (note that they are generally different) one has to have at least one longitudinal mode of the GMC fall within the bandwidth of the AWG 116 channels to achieve high output power necessary for efficient operation of the spectrally-sliced system. In order to achieve stable operation in the external cavity with varying ambient temperature and external cavity loss/dispersion fluctuation, the approach taken in the industry has been to (a) minimize the front facet reflectivity on the GMC 105 and (b) use long gain chips whose mode separation is sufficiently small in wavelength so that at least one GMC mode always appears in the AWG passband regardless of temperature and drive current.

The difficulty with both (a) and (b) is increased cost. Reflectivities lower than $10^{-4}$ requires precision coating and angled waveguides, while longer chips consume more of the wafer area. Typical Fabry-Perot lasers are 0.5 mm long, while for channel pitch below 100 GHz, the Fabry-Perot lasers will have to become longer than 2 mm to ensure that more than one mode always appears in the AWG channel passband.

Therefore, an unmet need for a low-cost high-performance WDM-PON solution exists in the industry. This application discloses apparatuses and methods of resolving the device related issue to create a cost-effective WDM-PON solution.

BRIEF DESCRIPTION OF THE FIGURES

FIG. 6A: Measurement data showing the effect of external modulation averaging reflector reflectivity through a 100-GHz AWG on the power spectral density $P_2$.

FIG. 6B: Measured longitudinal mode wavelengths of a Fabry-Perot gain-and-modulation chip in the presence of self-seeding using a modulation-averaging reflector.

SUMMARY OF THE INVENTION

This application discloses a WDM-PON transmitter that exhibits single-longitudinal mode operation across the operating current and temperature range, but it uses a multi-longitudinal mode Fabry-Perot resonator-type gain cavity. This invention is applicable to BLS-seeded and self-seeded passive optical network architectures. The disclosed colorless transmitter features Fabry-Perot mode tuning using temperature to select and maintain operation in one of a multiplicity of longitudinal modes of the Fabry-Perot cavity tuned to a specific channel frequency of the array waveguide grating across all temperatures in the operating temperature range.

The mode tuning is accomplished by changing the temperature of the GMC to move the mode wavelengths until the mode closest to the externally selected wavelengths (selected by the AWG channel) is matched. From the moment when the laser source is turned on to the moment when one of the modes is locked and maintained, a certain amount of mode hopping is expected, but once the mode is locked to the channel, the tuning algorithm and apparatus ensure that that one mode remains active over the entire operating temperature range of the module and the remote node.

The advantages of this approach relative to prior art are (a) the need to minimize the front facet reflectivity on the GMC has been removed and for some applications eliminated, and (b) there is no need for longer-cavity lasers, in fact, any cavity length can be used which eliminates the need for manufacturing of long lasers. The following text gives technological background.

Self-Seeding System

Figure 4A:
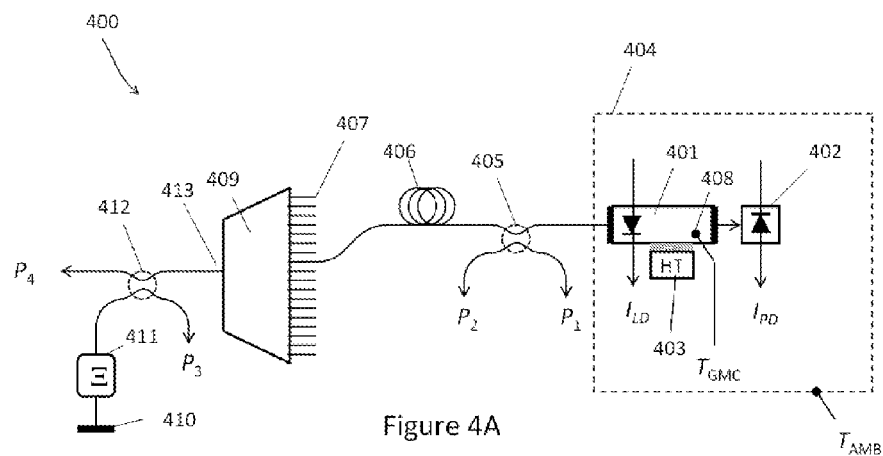
FIG. 4A: Block diagram illustrating the physical parameters that are relevant for mode tuning in a self-seeded network architecture.

FIG. 4A provides the definitions of quantities used in the description of the embodiments related to self-seeded network architectures. A GMC 401, its associated monitor photodiode 402, and a heater 403 in thermal contact with the GMC 401 are enclosed in an optical module 404. The GMC 401 is driven by laser drive current $I_{LD}$, while the monitor photodiode 402 captures a portion of the light emitted from the GMC 401 and converts it to monitor-photodiode current $I_{PD}$. The heater 403 maintains the GMC 401 at a temperature $T_{GMC}$ sensed using a thermocouple or a thermistor 408 in thermal contact with the GMC 401, while the ambient temperature (outside of the transceiver) is denoted with $T_{AMP}$. The light emitted by the GMC 401 is coupled to one of the channels 407 on the AWG 409 using distribution fiber 406 and via optical coupler 405. A portion of the optical power directed from the GMC 401 towards the AWG 409 is sampled using optical coupler 405 and the sampled power is denoted with $P_2$, while a portion of the optical power returning from the AWG 409 towards the GMC 401 is sampled and the sampled power is denoted with $P_1$. The optical signal emitted form the common port 413 of the AWG 409 is split into two portions at optical coupler 412. A portion of the optical power emitted from the common port of the AWG 409 is directed toward the central office ($P_4$) and a portion is reflected at a reflector 410 which is preceded by a modulation-averaging structure 411. The power returning from the modulation-averaging structure/reflector 410/411 is sampled and the sampled power is denoted with $P_3$.

The transceiver 404 operates with two control loops at all times: The first control loop adjusts the laser drive current $I_{LD}$ so that the monitor photodiode current $I_{PD}$ remains at a constant predetermined value—this type of control loop is ubiquitous in fiber optic components where the transmitter output power needs to be kept at an approximately constant value independently of temperature and ageing. In embodiments, the second control loop adjusts $T_{GMC}$ so that one select longitudinal mode of the Fabry-Perot cavity is aligned with the passband of the AWG at all times. In one embodiment, the second control loop adjust $T_{GMC}$ so that the drive current slope $dI_{LDO}/dT$ and curvature $d^2I_{LDO}/dT^2$ are maintained at a predetermined value and polarity, respectively. The preset slope is determined by experiment in which the relationship between the peak in output power $P_4$ is related to the minimum in the drive current $I_{LDO}$.

BLS-Seeded System

Figure 4B:
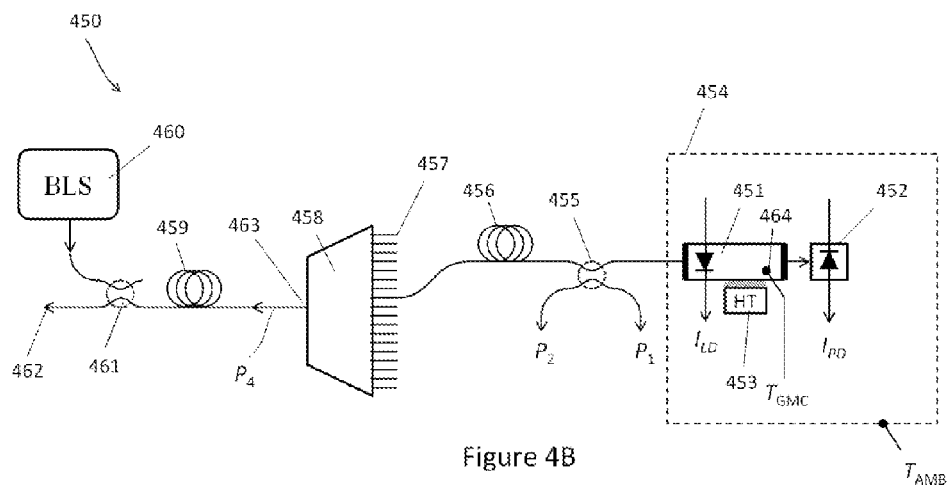
FIG. 4B: Block diagram illustrating the physical parameters that are relevant for mode tuning in a BLS-seeded network architecture.

FIG. 4B provides the definitions of quantities used in the description of the embodiments related to BLS-seeded network architecture. The optical source 450 comprises GMC 451, its associated monitor photodiode 452 and heater 453 all of which are enclosed in an optical module 454. GMC 451 is driven by drive current $I_{LD}$, while the monitor photodiode 452 captures a portion of the light emitted from the GMC 451 and converts it to monitor-photodiode current $I_{PD}$. The heater 453 maintains the GMC 451 at temperature $T_{GMC}$ sensed using a thermocouple or a thermistor 464 in thermal contact with the GMC 451. The ambient temperature is denoted with $T_{AMP}$. The light emitted by the GMC 451 is coupled to one of the channels 457 on the AWG 458 using distribution optical fiber 456 and via optical coupler 455. A portion of the optical power directed from the GMC 451 towards the AWG 458 is sampled using optical coupler 455 and the sampled power is denoted with $P_2$, while a portion of the optical power returning from the AWG towards the GMC is sampled and the sampled power is denoted with $P_1$. The optical signal emitted form the common port 463 of the AWG 458 is referred to as the output power $P_4$, which is directed towards the central office via trunk fiber 459. A broadband light source (BLS) 460 emits broadband light in the wavelength range within which the GMC 451 has gain. The light from the BLS 460 is coupled to the trunk fiber 459 at an optical coupler 461, filtered through the AWG 458 and inserted into the GMC 451 via the distribution fiber 456 and the optical coupler 455. The optical power from fiber 462 is directed towards the central office. The directions of optical power and their mutual relationship can be deduced from FIG. 4B in a straightforward manner.

The transceiver 454 operates with two control loops at all times: The first control loop is adjusting the GMC drive current $I_{LD}$ at a value that maintains the monitor photodiode current $I_{PD}$ at a constant predetermined value. The second control loop adjusts $T_{GMC}$ so that all times one select longitudinal mode of the Fabry-Perot cavity is aligned with the passband of the AWG. In one embodiment, $T_{GMC}$ is maintained at a value for which $I_{LDO}$ exhibits a minimum. In another embodiment, $T_{GMC}$ is maintained at a value for which $P_2$ exhibits a minimum.

Frequency f and free-space wavelength λ are used interchangeably in this application. They are related by $\lambda f = c$, where c is the speed of light in free space. Unless otherwise stated, wavelength λ refers to free space (vacuum). Wavelength in the material will be denoted with $\lambda_m$.

DETAILED DESCRIPTION

The detailed description discloses mode two tuning approaches (1 for current and 2 for optical power) for each of representative colorless WDM-PON architectures: A for self-seeding with modulation averaging reflectors (MAR system), B for self-seeding with Faraday rotators (FR system), and C for BLS-seeded system (BLS system)—a total of six (6) alternatives: A1, A2, B1, B2, C1, and C2.

I. Gain and Modulation Chip (GMC)

The GMC features a waveguide through which electromagnetic waves propagate and within which they experience both gain and where spontaneous emission is added. The GMC in this application has the structure of a Fabry-Perot resonator. The GMC is designed to have gain across the entire upstream band: In other words, there is sufficient gain in the GMC to amplify each of the wavelengths used in the upstream communication even though the GMC will be amplifying and communicating only at one of those wavelengths. If the upstream band of wavelengths is wider than what can be accomplished with a single semiconductor active region, two different types of gain media (and hence two different transmitting chains) may be used to cover the entire upstream band. Such a system could be referred to as a two-gamut system, rather than a colorless (or singlegamut) system. The inventions disclosed may be applied to such a system without departing from the spirit of the invention.

A Fabry-Perot resonator has two mirrors, one at each end of the waveguide as is well known in the art (a front facet mirror and a back facet mirror), and they have non-zero reflectivity for electromagnetic waves. The reflectivity of an uncoated facet of a typical semiconductor Fabry-Perot laser is around 30%, while high-reflectivity coating on a facet can increase this reflectivity to over 95%. Anti-reflective coatings can reduce this reflectivity below 1%, and if the front-facet also cuts the waveguide at an angle, reflectivities below 0.01% are achievable. Generally, the waveguide may contain other reflective features (other than the two mirrors) and may feature a emission spectrum that is more complex than that of a Fabry-Perot resonator. The invention disclosed will be applicable as long as there is multiplicity of longitudinal modes available for lasing and coupling to a channel of an external AWG.

Other tunable laser structures, such as, tunable DBR and DFB lasers have been used to match their wavelengths to an AWG channel, but they are all single-longitudinal mode devices and the tuning has to adjust that single longitudinal mode to the center wavelength of the passband of the AWG channel. There are no multiple modes to choose from. Additionally, when tunable DBR and DFB lasers are used, there is no feedback information on whether the wavelength of the AWG has been adjusted: the tunable lasers have own wavelength and power stabilization algorithms and hardware. In other words, the tuning is "open loop" in that the wavelength choice is set by a certain current, temperature or phase setting on the chip all being predetermined at manufacturing time. There is no information from the remote node about whether the wavelength is right.

In this invention, on the other hand (a) the optical source has multiple longitudinal modes rather than a single mode so the tuning method first selects one of those modes to lock to, and (b) the tuning method maintains real time adjustment to the wavelength specified by the channel of the AWG because there is always information from the remote node arriving to the transceiver: both for self-seeded and BLS-seeded systems.

It is important to note that the tuning apparatuses and method disclosed within are different from what is generally referred as tuning with an "intra-cavity filter", because the AWG (serving as the filter) is external to the cavity being tuned. Furthermore, it is also important to note that the tuning apparatuses and method disclosed within are different from what is generally referred as temperature tuning of the gain or gain peak, because it is the channel of the AWG that determines the wavelength and not the gain peak of the semiconductor laser.

No matter how low the facet reflectivity, the two facets will form a resonator around the central gain region and the gain and emission spectra will exhibit peaks (resonances) at wavelengths where constructive interference occurs in the resonator and valleys at wavelengths where the interference is destructive. The peaks and valleys in the spectra are commonly referred to as fringes and are approximately periodic in frequency for a classical Fabry-Perot structure. The wavelengths of the peaks, also referred to as modes or mode frequencies, and their separation depend on the refractive index, the refractive index dispersion (wavelength dependence of the refractive index) in the resonator n(f) and the length of the resonator L. The mode frequencies $f_m$ and their separation $\Delta f_m$ are given with $f_m = mc/2$ nL, where m is the mode number, and $\Delta f_m = c/2$ nL, respectively. These facts are well known in the art of semiconductor laser and optical amplifier technology and can be found in publicly available texts, such as, L. A. Coldren and S. W. Corzine, *Diode Lasers and Optical Integrated Circuits*, published by Willey and Sons. Inasmuch as WDM-PON systems are generally single transverse mode, the Fabry-Perot structures in this application are all single transverse mode devices.

II. Design of WDM-PON Source with Single Longitudinal Mode

To ensure that only one mode appears in the passband of the AWG at all times, one has to satisfy two conditions: (i) the longitudinal mode separation of the Fabry-Perot resonator of the GMC has to be larger than the FWHM of the AWG channel passband, and (ii) one has to tune the wavelength of that selected mode to remain in the passband of the AWG for all ambient temperatures.

We have experimentally estimated that only one mode will oscillate if the Full-Width Half Maximum (FHWM) of the array-waveguide channel passband is equal to or smaller than the longitudinal mode separation $\Delta f_{GMC}$ of the Fabry-Perot resonator with gain (the GMC). This condition is expressed as FWHM≤$\Delta f_{GMC}$, where both FWHM and $\Delta f_{GMC}$ may be expressed in frequency (GHz) or in wavelength (nm). For example, we have observed experimentally that for an AWG with 100 GHz channel separation and a passband width FWHM=0.40 nm, using a laser with $\Delta f_{GMC}$=0.53 nm never oscillates in more than one mode. On the other hand, using a gain medium with mode separation $\Delta f_{GMC}$=0.32 nm, we observe two mode operation at some temperatures.

Given a semiconductor cavity length, one can estimate the amount of temperature tuning necessary to adjust the mode to a correct wavelength. The resonant modes of the GMC chip change with the optical length of the cavity. The typical drift in the mode frequencies of semiconductor chip etalon (Fabry-Perot cavity) modes is approximately $\beta \approx 0.1$ nm/° C. or −12.5 GHz/° C. If the mode separation between the gain-chip modes is $\Delta f_{GMC}$, then the change in chip temperature necessary to bring the mode into the center of the passband is $\Delta_{GMC}/\beta$, which for the example shown above equals about 4° C. This is a relatively small temperature change and it is easily applied to the GMC using a heater or a thermoelectric cooler attached to it.

The GMC temperature $T_{GMC}$ is controlled by mounting the GMC to a heater or a thermoelectric cooler. Either one can be used without departing from the invention. The thermoelectric cooler offers the possibility to reduce the temperature below the ambient temperature, but at the expense of efficiency.

The essential advantage of the disclosed tuning principle is that the same GMC cavity can be used for AWGs with any frequency grid smaller than the grid for which it was designed. Namely, the tuning range is determined by the GMC cavity, and not by the AWG passband. For this reason, one GMC cavity design will serve all frequency grids that are finer than the one for which the GMC cavity was designed. Clearly, once a gain-and-modulation device is selected and $\Delta f_{GMC}$ fixed, we can use that gain device and generate a single longitudinal-mode device with any array-waveguide grating that has FWHM≤$\Delta f_{GMC}$. In other words, a laser that tracks a channel of a 100 GHz AAWG with a single mode, will work equally well on a 50 GHz AAWG.

In embodiments presented below, whether and when a longitudinal mode of the gain medium is matched to the passband of the array-waveguide grating will be determined by on the type of WDM-PON architecture is used: (1 & 2) self-seeding or (3) broad-light source seeding and on the desired complexity of the transceiver: (A) sensing current or (B) sensing optical power. As will be disclosed in text below, mode matching will coincide with (a) a local minimum in the drive current $I_{LDO}(T_{GMC})$ or emitted optical power $P_2(T_{GMC})$ relationships for BLS-seeding, namely, slope $dI_{LDO}/dT \approx 0$ and curvature $d^2I_{LDO}/dT^2 > 0$ (and equivalently for emitted power $P_2$), (b) a local maximum in the return optical power $P_1(T_{GMC})$ relationship for self-seeding, namely, slope $dP_1/dT \approx 0$ and curvature $d^2P_1/dT^2 < 0$, (c) a predetermined slope and curvature polarity in drive current $I_{LDO}(T_{GMC})$ relationship for self-seeding, namely, slope $dI_{LDO}/dT \approx$ fixed value and curvature $d^2I_{LDO}/dT^2$ fixed polarity.

Additionally, forcing the predetermined slope and curvature of $I_{LDO}(T_{GMC})$ disclosed in (c) above may also be adjusted by forcing the $I_{LDO}(T_{GMC})$ to take value that is defined by a predetermined fraction of the separation between the maximal $\max[I_{LDO}(T_{GMC})]$ and the minimal $\min[I_{LDO}(T_{GMC})]$ value of $I_{LDO}(T_{GMC})$. In this way, the selected predetermined value of $I_{LDO}(T_{GMC})$ is defined relative to the rest of the $I_{LDO}(T_{GMC})$ relationship which can be established every time at the power-up of the transceiver. Furthermore, the case (c) above can be improved by dividing the slope of the $I_{LDO}(T_{GMC})$ by the difference between $\max[I_{LDO}(T_{GMC})]$ and $\min[I_{LDO}(T_{GMC})]$ to obtain a relative response that is not dependent on the absolute changes in the $I_{LDO}(T_{GMC})$ relationship, but only on the shape.

III. The Effect of Facet Reflectivity in a Self-Seeding Architecture

The effect of non-zero front facet reflectivity is illustrated with the help of FIG. 6A which shows the emission spectra from a GMC biased at constant current externally terminated with a Gaussian AAWG with FWHM=52 GHz as the external mirror reflectivity is changed from near zero (a) $R_{EXT} \approx 0$ to maximum (d) $R_{EXT} \approx 1$ through two intermediate values (b) and (c). When there is no external termination ($R_{EXT} \approx 0$), the emission from the gain chip shows resonant fringes with the gain-chip mode separation $\Delta f_{GMC} \approx 47$ GHz and fringe depth $x \approx 8$ dB. Fringe depth X is defined as the peak power divided by valley power. Clearly, at least one GMC mode, possibly two can fit within the FWHM of the AAGW filter as $\Delta f_{GMC} < \Delta f_{3dB}$. As the round-trip loss in the external cavity reduces (moving from $R_{EXT} \approx 0$ towards $R_{EXT} \approx 1$), the threshold current reduces, and once the operating current, which was kept unchanged, becomes larger than the threshold current, the gain clamps. Threshold gain reduces as the round-trip losses reduce. Inasmuch as the fringe depth depends on the gain-chip gain, it also reduces with the reducing external cavity losses. Furthermore, a reduction in gain means increased absorption, which in turn increases the refractive index of the cavity causing the GMC modes to move towards longer wavelengths. Fringe depth X is related to the product RG of the round-trip gain $G = \exp(2 gL)$ and round trip power reflectivity $R = R_F R_B$, where $R_F$ and $R_B$, are optical power reflectivities of the front and the back facet of the gain chip, respectively, via: $\sqrt{RG} = (\sqrt{x}-1)/(\sqrt{x}-+1)$. The GMC measured for FIG. 6A has unsaturated gain $G \approx 27$ dB (for the $R_{EXT} \approx 0$ curve) and if we assume that the back facet is reflectivity is high ($R_B \sim 1$), we obtain front facet reflectivity $R_F < 250$ ppm. At the lowest round-trip loss ($R_{EXT} \approx 1$ case) the gain compresses to $G \approx 7$ dB, which under the same assumptions yields fringe depth $x \approx 0.6$ dB in the final emission spectra (this small variation is visible at the top of the $R_{EXT} \approx 1$ curve).

Following the analysis of FIG. 6A, it is clear that coating the edges of gain chips to achieve very low facet reflectivity is beneficial and necessary to realize extended cavity resonators. When the GMC chip is externally seeded, the effect of the front facet reflectivity is reduced is it figures as a product between the gain and the facet reflectivity: $GR_F R_B$. However, even though very low fringe depth can be obtained, it remains dependent on the external cavity losses, it is not stable: it will vary depending on the specific distribution fiber length and connector quality: every time a technician disconnects and reconnects the network cable, the conditions change.

FIG. 6B illustrates how longitudinal mode wavelengths 601 seen in the emitted light at port $P_2$ move with temperature and how the externally defined wavelength locks the mode closest to a fixed value 602 determined by the AWG channel passband peak wavelength

IV. Physical Phenomena Relied on to Tune the Modes

Figure 5A:
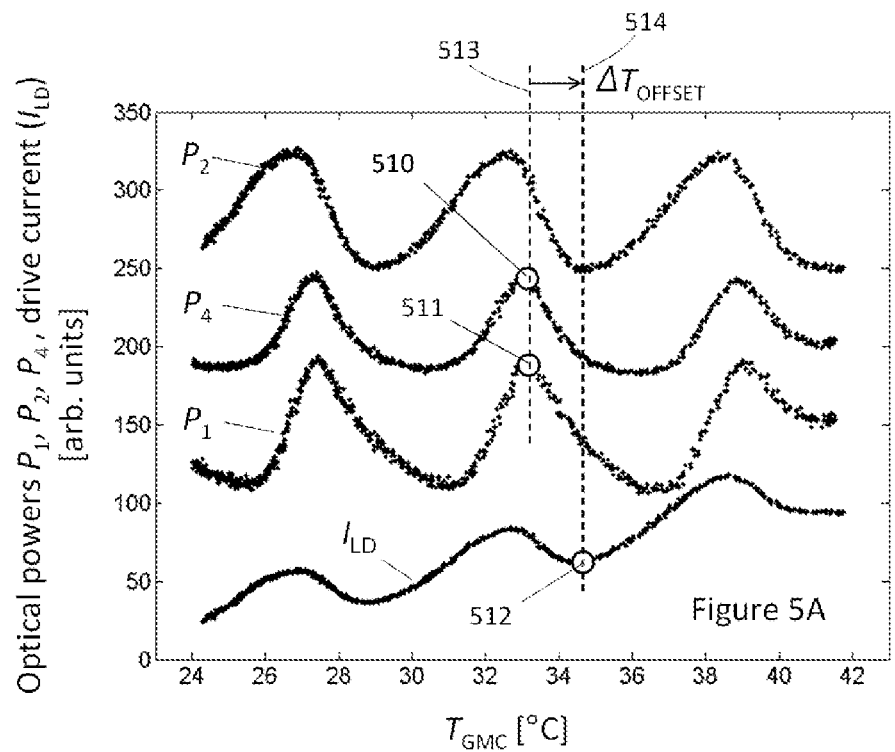
FIG. 5A: Measurement data showing the relationship between optical powers $P_1$, $P_2$, $P_4$, and laser drive current $I_{LD}$ versus temperature in a self-seeded system with an averaging reflector.
Figure 5B:
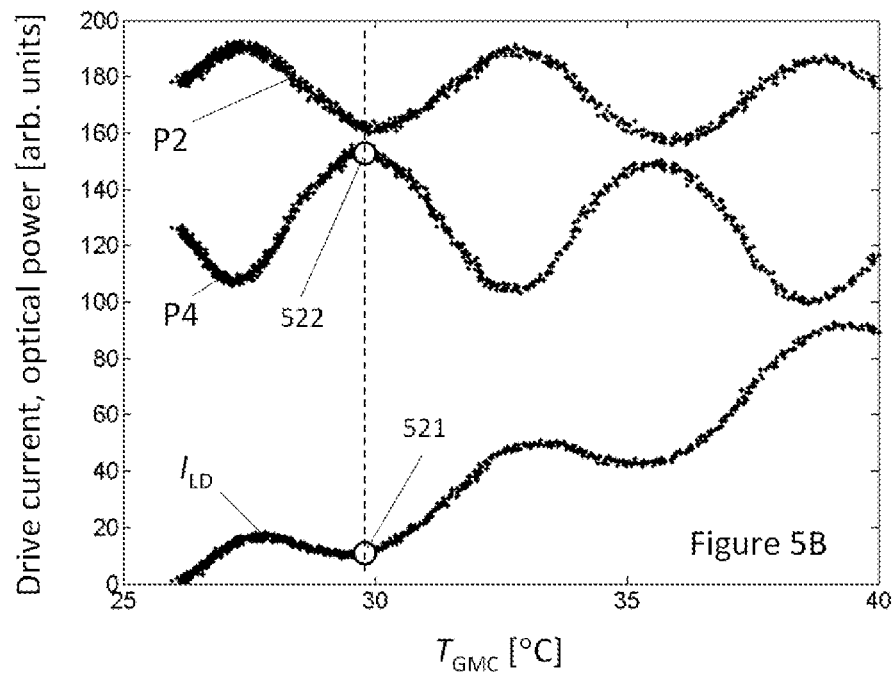
FIG. 5B: Measurement data showing the relationship between optical powers $P_2$, $P_4$, and laser drive current $I_{LD}$ versus temperature in a BLS-seeded system.

FIGS. 5A and 5B show the experimental evidence that gives the foundation for the disclosed methods and apparatuses for tuning the Fabry-Perot modes in self-seeded and BLS-seeded systems. FIG. 5A shows a measurement of optical power $P_1$, $P_2$, $P_4$ and laser drive current $I_{LD}$ in a self-seeded system as shown in FIG. 4A while $I_{PD}$ is maintained constant and the temperature of the GMC $T_{GMC}$ is varied by approximately 15° C. FIG. 5B, discussed later, shows the measurement of optical powers $P_2$, $P_4$ and laser drive current $I_{LD}$ in a BLS-seeded system while $I_{PD}$ is maintained constant and $T_{GMC}$ is varied. In either case, the $I_{PD}$ is maintained constant by adjusting $I_{LD}$ using a control loop as is well known in the art of fiber-optic modules.

As $I_{PD}$ is maintained constant, one expects the laser current $I_{LD}$ to increase and oscillate when the temperature rises. FIGS. 5A and 5B both show that the drive current $I_{LD}$ oscillates as well as increases with temperature. It will be useful to interpret this variation as a superposition of two components: a component $I_{LDL}$ that grows almost linearly with temperature and a component $I_{LDO}$ that oscillates in temperature: $I_{LD} = I_{LDL} + I_{LDO}$. The almost-linear term $I_{LDL}$ results from temperature properties of the GMC gain medium, the material and the laser resonator design and average losses, while the oscillating part $I_{LDO}$ originates from the interaction of the GMC with the external filter, the AWG. When we search for an extremum in the drive current, we mean searching for the extremum in the oscillating part $I_{LDO}$. When the slope $dI_{LDL}/dT$ (linear component) is small in comparison with the slope in $dI_{LDO}/dT$ (oscillating component), the minima in the measured $I_{LD}$ and $I_{LDO}$ are approximately equal and hence the minimum in the measured $I_{LD}$ can be used in place of the minimum in $I_{LDO}$. However, when this is not the case, one should first estimate the slope of $I_{LDL}$ versus temperature and subtract it from measured $I_{LD}$ to get an estimate of $I_{LDO}$ and then determine the minimum or maximum on the approximate versions of $I_{LDO}$. Inasmuch as the slope $dI_{LDL}/dT$ is a property of the material and design, it does not vary much between different GMC units. For this reason, an approximate value of the slope can be determined at manufacturing time from a collection of GMC units and then that same number can be used for all modules. Removing just the first-order linear term from $I_{LD}$ significantly improves the accuracy of the extrema search or specific slope in $I_{LDO}$. Finally, when we refer to a minimum in the drive current $I_{LD}$ in the text, we mean a minimum in $I_{LDO}$, the oscillating component of $I_{LD}$ and expect that the $I_{LDL}$ term has been subtracted from the measured $I_{LD}$.

Continuing with the general behavior of graphs shown in FIGS. 5A and 5B, it is visible that as the external (AWG passband) wavelength scans the mode spectra, it sometimes coincides with a longitudinal mode of the Fabry-Perot cavity in which case due to the constructive interference, the emission and light amplification is higher for lower current. On the other hand, when the passband wavelength produces destructive interference in the cavity, the emission and amplification is lower for the same current.

IV.1 Self-Seeded System Measurements

The graphs in FIG. 5A show that as temperature increases, the optical powers $P_1$, $P_2$, and $P_4$, all oscillate as the externally defined AWG-channel wavelength scans though the Fabry-Perot modes: the Fabry-Perot modes move almost linearly with the temperature, while the AWG-channel wavelength is fixed. The laser drive current $I_{LD}$ on-the-average increases with the temperature, but also oscillates. As noted before, we are interested in the oscillatory portion of the laser drive current. The challenge for the tuning hardware and method is to maximize the output power $P_4$, while using only the information available to the client end, namely, in the transceiver, next to the GMC. Inasmuch as the distribution fiber 406 can be several kilometers long and that the optical coupler 405 may be integrated with the transceiver 404, the measured quantities that may be used as feedback for tuning are $P_1$, $P_2$ or $I_{LD}$.

The graphs in FIG. 5A show that $P_4$ is proportional to $P_1$ (peaks 510 and 511 are at the same temperature) and that $P_2$ is approximately proportional to $I_{LD}$, but that local minima 512 in $I_{LD}$ (or more correctly, the minima in the oscillating portion of $I_{LD}$) do not exactly correspond to the maxima 510 in $P_4$ as one would expect. They are offset by a small temperature $\Delta T_{OFFSET}$=min($I_{LD}$)−max($P_4$)~1° C. Furthermore, neither of the optical signals intensities $P_1$, $P_2$, $P_4$ are sinusoidal with temperature as one would expect. The offset and the asymmetry are caused by a combination of two phenomena: (a) more spontaneous emission is present in the light captured by the monitor photodiode ($I_{PD}$) and in the optical power $P_2$, than in the light filtered through the AWG ($P_1$ and $P_4$), so the optical power measured at $P_2$ and contributed by $I_{LD}$, comprises of two components that vary differently with the wavelength and intensity, and (b) the seeding intensity changes the refractive index in the cavity adding an external-filter influenced wavelength shift. The latter effect was discussed in connection with FIG. 6A. Increased temperature shifts longitudinal modes towards longer wavelengths, but the loss-dependent mode pulling effect illustrated in FIG. 6A adds a non-linearity: modes are pulled towards longer wavelengths (same direction as increasing temperature) when a mode wavelength is moving towards the center wavelength of the AWG channel passband (from either wavelength direction). This means that mode wavelength drift with temperature is larger on one side of the AWG channel than on the other. When combined with oscillating mode intensity and oscillating spontaneous emission intensity with temperature, these two phenomena (temperature increase and external loss change) cause the asymmetry in the response curves shown in FIG. 5A.

IV.2. BLS-Seeded System Measurements

The graphs in FIG. 5B show that as temperature increases, the optical powers $P_2$ and $P_4$, all oscillate as the externally defined AWG-channel wavelength scans through the Fabry-Perot modes: the Fabry-Perot modes move almost linearly with the temperature. The laser drive current $I_{LD}$ on the average increases with the temperature, but also oscillates. As noted before, we are interested in the oscillatory portion $I_{LDO}$ of the laser drive current $I_{LD}$. The challenge for the tuning hardware and method is to maximize the output power $P_4$, while using only the information available to the client end, namely, in the transceiver, next to the GMC. Inasmuch as the distribution fiber 456 can be several kilometers long, the measured quantities that may be used as feedback for tuning are $P_1$, $P_2$ or $I_{LD}$.

The graphs in FIG. 5B show that $P_4$ is proportional to $P_2$, and that $P_2$ is approximately proportional to the oscillatory portion of $I_{LD}$. The output power versus temperature $P_4$ is approximately sinusoidal. Here it is clear that to adjust the output power to a maximum 522, one needs to either maintain the temperature of the GMC at a value that gives a minimum of the $I_{LDO}$ 521 or a minimum in $P_2$. It appears counter-intuitive that higher output power $P_4$ should correlate with lower GMC output power $P_2$. The reason for this is that extra spontaneous emission power that is present in the $P_2$ emission, but not in $P_4$. Spontaneous emission is proportional to the drive current $I_{LD}$.

V. Network Component Embodiments

In one embodiment, the GMC is a reflective semiconductor optical amplifier (RSOA), which includes an anti-reflective coating and may include a curved waveguide on the front facet and a high-reflectivity mirror on the back facet. The front facet may exhibit reflectivities below 100 ppm. The back facet is typically designed for transmission that provides sufficient amount of light to the monitor photodiode.

In another embodiment, the GMC is a coated Fabry-Perot laser (CFP), which includes an anti-reflective coating on the front facet and a high-reflectivity mirror on the back facet. The front facet may exhibit reflectivities below 2000 ppm. The back facet is typically designed for transmission that provides sufficient amount of light to the monitor photodiode and it may not be coated at all.

In another embodiment, the GMC is an uncoated Fabry-Perot (UFP) laser. The front facet may exhibit reflectivities around 30% as is well known in the art. The light emanating from the back facet is directed towards a monitor photodiode.

In all GMC embodiments, it is essential that devices exhibit a multiplicity of longitudinal modes. The RSOA, CFP, and UFP are structurally similar and they all are inherently multi-longitudinal mode devices.

In all GMC embodiments, the monitor photodiode may be mounted to capture the light emitted from the back facet or to capture a portion of light emitted from the front facet. In this application, the front facet of the GMC is the output facet or the one where light used in the optical communications exits. The figures in this application all show and disclose architectures where the monitor photodiode is mounted on the back facet, but it is clear that the embodiments apply to the arrangements where the monitor photodiode is mounted on the front facet.

In this application, monitor photodiode has a slow response; sufficiently slow that it does not follow the data modulation, it measures the time-averaged light intensity. High-speed photodiode has sufficient bandwidth to capture the amplitude modulation of the data stream. Such a high-speed photodiode also captures the time-averaged intensity.

The length of distribution fibers in the embodiments range from tens of meters to tens of kilometers. The frequency (wavelength) band containing the WDM channels used for downstream transmission are referred to the downstream band, and similarly for the upstream band. In the following description of the invention, C-band is used for upstream, and L-band for downstream traffic, noting that any combination of bands or fractions of a band can be used with this invention without departing from the spirit of the invention.

The array-waveguide grating (AWG) is an optical multiplexer/demultiplexer which demultiplexer wavelength-division multiplexed optical signals entering a common port into M signals at M different distribution ports with M different wavelengths. For any optical signal arriving to any of the distribution ports, the AWG is effectively a bandpass optical filter centered at a center wavelength and a bandpass bandwidth expressed. Both the center wavelength and bandwidth may be expressed in terms of wavelength or frequency without loss of generality. For the purposes of this application, a passband is a wavelength range (or frequency range) for which the transmission from the distribution port to the common port is greater than one half of the maximum transmission at the center of the passband or the transmission at the center wavelength. The terms used for characterize the bandwidth of such bandpass filters are 3-dB bandwidth or full-width-of-half-maximum (FWHM). The AWG is typically cyclical so that wavelength-division multiplexed signals arriving at the common port of the AWG with wavelength separation equal to the free-spectral range ($FSR_{AWG}$) of the AWG are mapped into the same of the M channels on the distribution ports as is well known in the art. The M channel wavelengths and wavelength separation between the adjacent channels on the AWG are specified by the appropriate standard for WDM communications. The wavelength separation is typically expressed in frequency separation; typical standard ITU channel grids are presently $\Delta f_{AWG}$=200 GHz, 100 GHz, 50 GHz, or 25 GHz grid, which means that the frequency separation between adjacent channels (center to center) is approximately equal to $\Delta f_{AWG}$. Athermal AWG (AAWG) means that it has compensated thermal drift of the channel frequencies. The type of AAWG of interest in this invention is a cyclical AAWG covering C and L bands, so that these two bands can be used for separate upstream and downstream signals. However, the cyclical property is not required for practicing the invention. In other words, channel 7 in the C-band, for example, used for upstream data transfer has it dual in the L-band: channel 7 in the L-band is used for downstream signaling, and consequently distribution port 7 passes channel 7 in the C-band and channel 7 in the L-band. The channel separation and numbering used in this example are 100 GHz and $f_C(k)$=196.2−0.1·k [THz] and $f_L(k)$=191.2−0.1·k [THz], for C and L bands, respectively. The AWG 202 is athermal in that it provides temperature sensitivity that is low enough to satisfy ITU recommendations on the channel frequencies without the requirement for cooling or heating—it remains passive. Each passband is specified by the filter shape which may Gaussian or flat, and the bandwidth to a certain degree characterized with the 1 dB and 3 dB bandwidths. For the purposes of this application, we shall use the term full-width at half maximum (FWHM) for the 3-dB bandwidth the AWG 202 passband to characterize the AWG passband.

A modulation averaging reflector comprises a mirror and a modulation averaging structure. Modulation averaging structures can be implemented in fiber or planar lightwave circuit technology and are described in US patent applications 20140029083 and 20140010544, and U.S. Pat. No. 8,559,775.

A reflector assembly is an optical component comprising one reflection port and one transmission port. Optical signals entering the reflection port are partially transmitted and exit at the transmission port, while a portion of the optical signal is reflected back and exit at the reflection port. For the purposes of this application, a reflector assembly may include a modulation-averaging structure arranged with a mirror and at least one optical coupler, in which case it is referred to as a reflector assembly with modulation averaging. A reflector assembly may include a Faraday rotator and mirror (effectively a Faraday rotating mirror) in which case it is referred to as a reflector assembly with a Faraday rotator. Finally, a reflector assembly may include both a Faraday rotator and a modulation averaging structure, all depending on the specific design and requirements of the network.

VI. Method Embodiments

In the above text it was noted that the first control loop (varying laser current to maintain constant monitor photodetector output) is common to fiber-optic modules. The second control loop is unique and innovative and the following embodiments are based on three different implementations of the second control loop.

In one embodiment, the second control loop adjusts the temperature $T_{GMC}$ to a value where the laser drive current $I_{LD}$ is fixed with predetermined slope and curvature. This embodiment of the transmitter and control loop is applicable to self-seeded systems. When broadband light sources (BLS) seeded systems are used, the $I_{LDO}$) is minimized.

In another embodiment, the second control loop adjusts the temperature $T_{GMC}$ to a value where the emitted power $P_2$ is minimized. This embodiment of the transmitter and control loop applied to BLS-seeded systems.

In yet another embodiment, the second control loop adjusts the temperature $T_{GMC}$ to a value where the emitted power $P_1$ is maximized. This embodiment of the transmitter and control loop applied to self-seeded systems.

VII. Self-Seeded System Embodiments with Modulation Averaging

Figure 1:
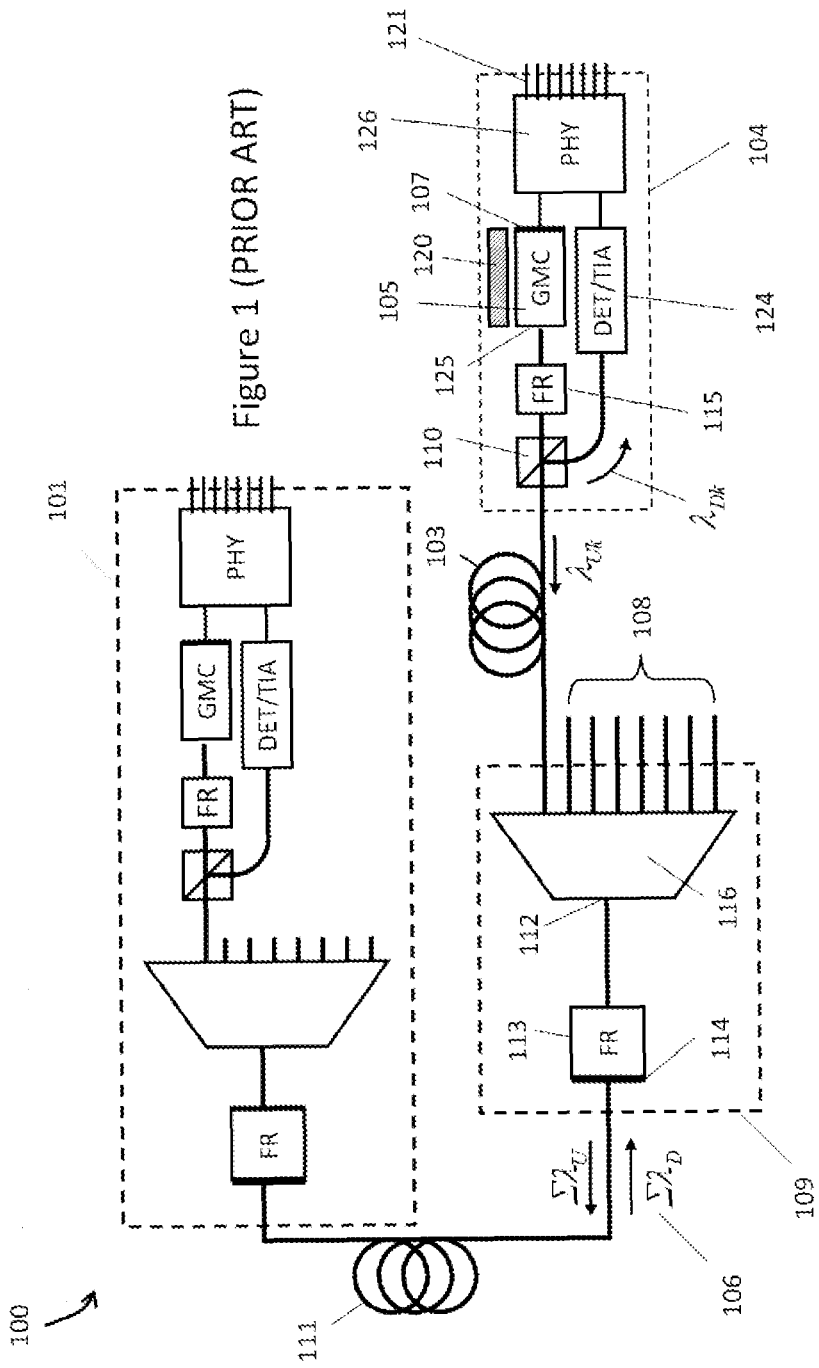
FIG. 1: (PRIOR ART) Schematic illustrating a self-seeded WDM-PON system.
Figure 2A:
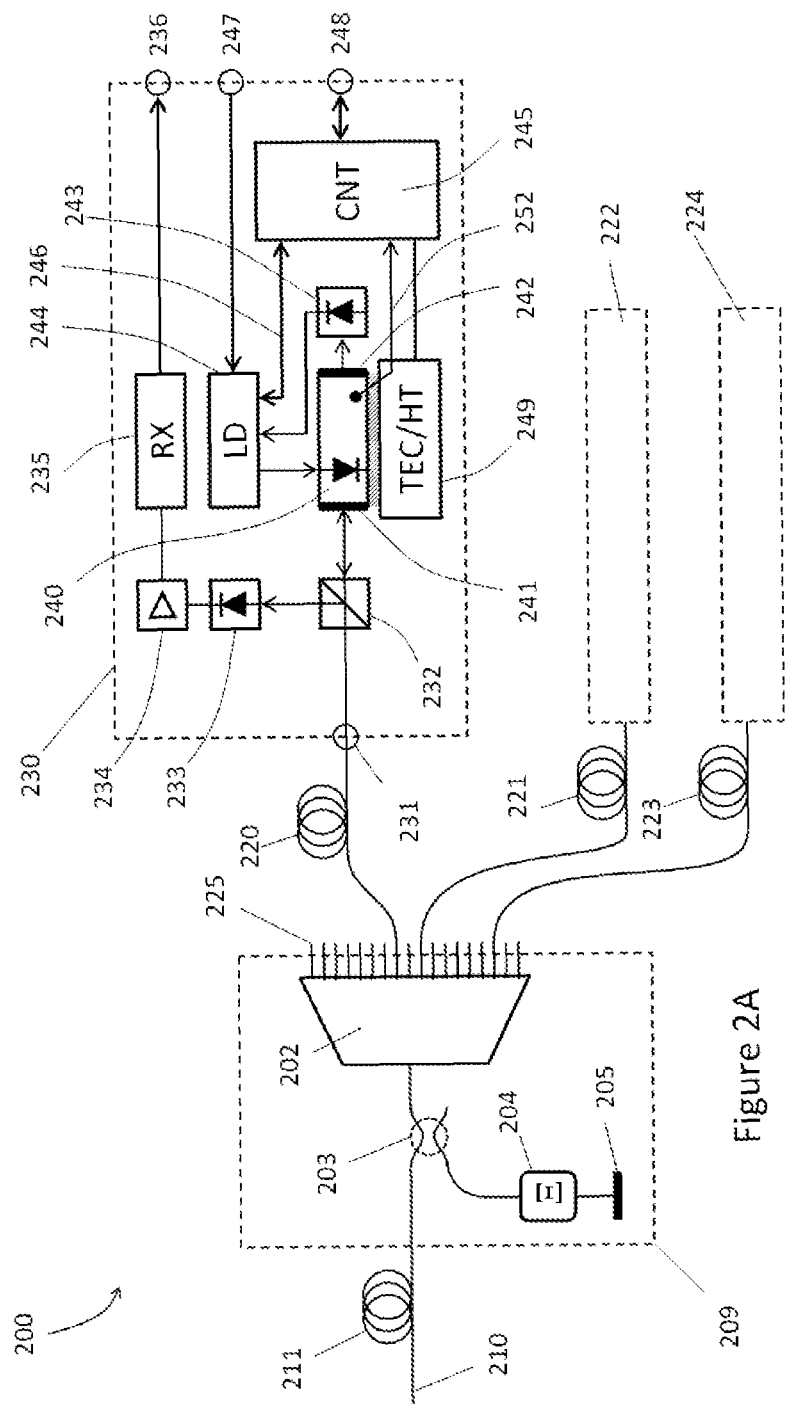
FIG. 2A: One embodiment of transmitter optical source employing GMC mode to AAWG channel tuning based on sensing the laser drive current $I_{LD}$. The transmitter is based on self-seeding with modulation averaging.
Figure 2B:
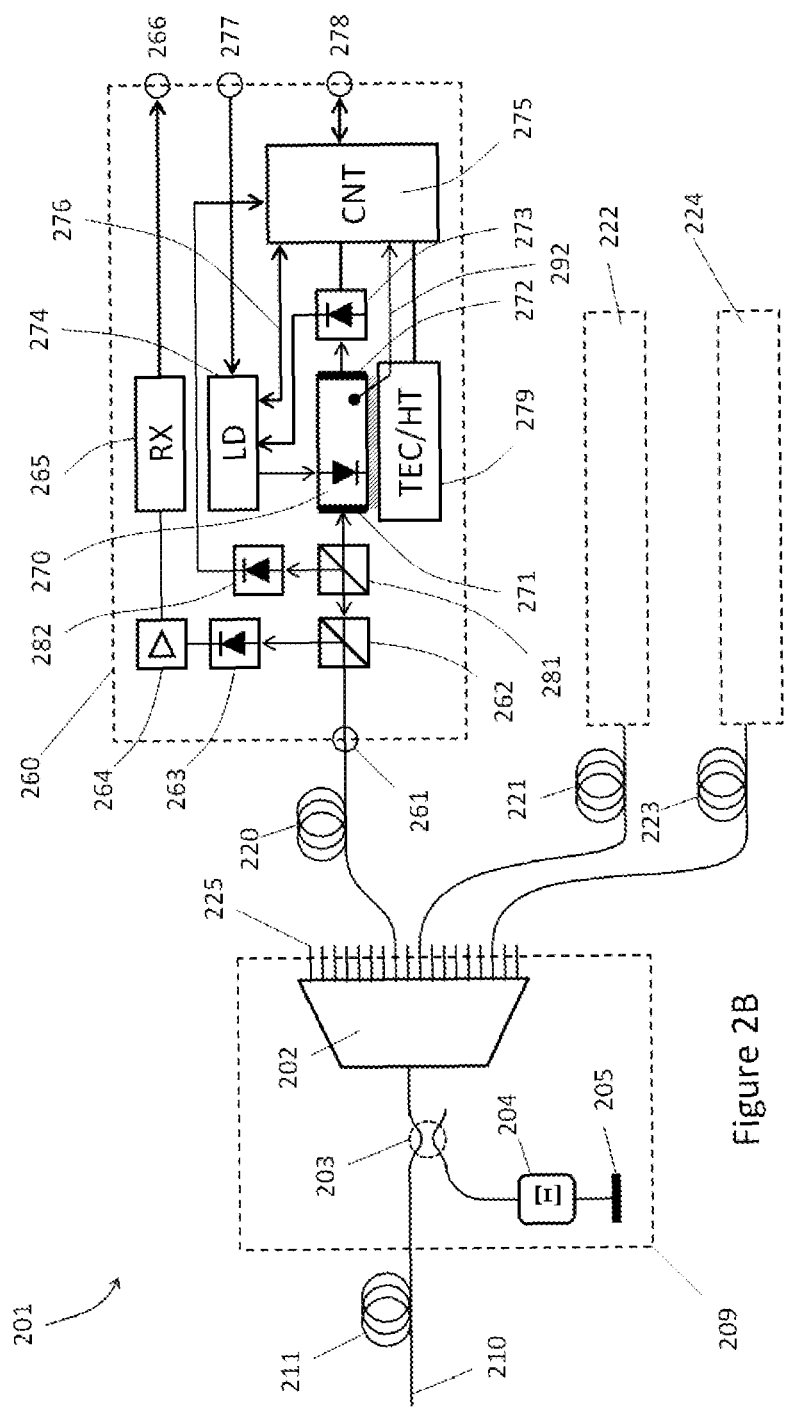
FIG. 2B: One embodiment of transmitter optical source employing GMC mode to AAWG channel tuning based on maximizing the return power $P_1$. The transmitter is based on self-seeding with modulation averaging.

In one embodiment, illustrated in FIG. 2A, a WDM optical transmitter section 200 of an WDM-PON system comprises a remote node 209 and at least one optical transceiver 230 connected to remote node 209 using a distribution fiber 220. To operate the WDM-PON source, at least one transceiver is required, but FIG. 2A illustrates three optical transceivers 230, 222, and 224 connected to the remote node 209, each transceiver using its own distribution fiber 220, 221, and 223, respectively. FIG. 2B illustrates three optical transceivers 260, 222, and 224 connected to the remote node 309, each transceiver using its own distribution fiber 220, 221, and 223. The distance between the remote node 209 and any of the transceivers 230, 222, and 224 is determined by the available link budget, desired line rate, and dispersion penalty as is well known in the art.

The remote node 209 comprises an array waveguide grating (AWG) 202 with at least one common port and M distribution ports 225, an optical output coupler 203, a third mirror 205 and a modulation averaging structure 204 which together with the third mirror 205 forms a modulation-averaging reflector. Output coupler 203, modulation averaging structure 204, and the mirror 205 constitute the reflector assembly of this embodiment. The AWG 202 is an optical multiplexer/demultiplexer which demultiplexes wavelength-division multiplexed optical signals entering common port into M signals at M different distribution ports 225 with M different wavelengths.

The third mirror 205 is a high-reflectivity mirror disposed at the end of a fiber. Such fiber mirrors are commercially available from a number of manufacturers. The reflectivity spectrum of the mirror has high reflection coefficient, greater than 90% over the entire upstream frequency (wavelength) band. The modulation averaging structure 204 is a passive optical component that averages amplitude modulated optical signals, and may also depolarize the optical signals.

In one embodiment, the transceiver 230 comprises GMC, duplexer, receiver chain and transmitting chain, including the heater are enclosed into a single housing, such as an SFP or XFP module, but may also be only partially packaged without departing from the spirit of the invention.

There are two transceiver embodiments that feature mode tuning. In FIG. 2A the tuning is done using $I_{LD}$ and in FIG. 2B using returned optical power $P_1$. The remote node and trunk fiber are numbered identically in FIGS. 2A and 2B to stress that either one of the transceivers shown in FIG. 2A and FIG. 2B may be used with the same arrangement in the remote node.

VII.1. Sensing Laser Drive Current (A1)

Architecture 200 uses at least one transceiver 230 which comprises an optical port 231 which may be connectorized, electrical ports 236, 247, and 248, a duplexer 232 optically coupled to the optical port 231, GMC 240 which includes front facet mirror 241 and back-facet mirror 242, a back-facet monitor photodiode 243, a laser driver chip "LD" 244, a high-speed photodetector 233, a transimpedance amplifier 234, a receiver chip "RX" 235, a heater stage "TEC/HT" 249 in thermal contact with GMC 240, and a controller "CNT" 245. The electrical ports comprise receiver output (downstream data output) 236 which may be differential, transmitter data input (upstream data input) 247 which also may be differential, and module diagnostics port 248 coupled to the controller 245 which may send traffic in either direction. The controller 245 monitors the temperature using a thermocouple or thermistor via line 252; the temperature sensor is denoted with the dot at the end of the line 252. The controller 245 controls the temperature of the GMC 240 by energizing the heater or thermoelectric cooler 249. The controller 245 furthermore communicates with the laser driver chip 244 via line 246: it sets the desired monitor photodiode current $I_{PD}$ (effectively GMC 240 output power) and sends control signals to the laser driver 244, such as, laser off and on, and receives the information on the magnitude of the drive current $I_{LD}$ and diagnostic signals, such as, for example, laser fault, over heating, and so on.

The transceiver is operatively configured to receive and emit optical signals through the optical fiber port 231 and electrical data and control signals through electrical ports 236, 247, and 248. Optical signals with wavelengths in the downstream wavelength range are incident through the optical fiber power 231 are routed by the duplexer 232 to the high-speed photodetector 233 where the optical intensity is converted to electrical current and then converted to voltage at the trans-impedance amplifier 234. The analog signal at the exit of the trans-impedance amplifier 234 is amplified and further processed in the receiver 235 before it is routed to the electrical ports 236 associated with the transceiver electrical output. The high-speed photodetector 233, transimpedance-amplifier 234, and the receiver 235 constitute the receiving chain of transmitter 230.

The GMC 240 is driven directly using a laser driver 244 which brings DC bias (operating point) and the AC modulation according to the data input 247 as is well known in the art. The current output from the monitor photodiode 243 coupled to the GMC 240 is fed to the laser driver 244 as input to the analog feedback loop that maintains the laser output constant over time and temperature.

The longitudinal mode separation $\Delta f_{GMC}$ of the GMC 240 is designed to ensure that only one mode ever appears within the passband of the channel of the external AWG, hence $\Delta f_{GMC} \geq FWHM$.

In one embodiment, the mode tuning in a WDM-PON transmitter architecture shown in FIG. 2A comprises measuring the photodetector current $I_{PD}$ and simultaneously adjusting the GMC drive current $I_{LD}$ to maintain the $I_{PD}$ at a preset value. The controller further periodically dithers the heater drive power, measures a periodic oscillation in GMC temperature and the resulting periodic oscillation in the GMC drive current (ED). The controller is operatively configured to use the time evolution of GMC drive current $I_{LD}$ and the temperature $T_{GMC}$ to maintain the average GMC temperature $T_{GMC}$ at a value for which the slope $dI_{LDO}/dT$ is fixed to a non-positive number and the curvature is negative (see the slope of $I_{LD}$ where $P_4$ is at a maximum in FIG. 5A). An alternative is setting the $I_{LD}$ at a preset fraction of the value between its $\min(I_{LD})$ and $\max(I_{LD})$. In this way, one longitudinal mode of the GMC will remain within the passband of the array-waveguide array regardless of the ambient temperature. The case of the transceiver 230 is assumed to be at an ambient temperature $T_A$ which is generally different from the GMC 240 temperature $T_{GMC}$.

VII.2. Sensing Return Optical Power (A2)

Architecture 201 uses at least one transceiver 260 which comprises an optical port 261 which may be connectorized, electrical ports 266, 277, and 278, a duplexer 262 optically coupled to the optical port 261, a gain and modulation chip (GMC) 270 which includes front facet mirror 271 and back-facet mirror 272, a back-facet monitor photodiode 273, a laser driver chip "LD" 274, a high-speed photodetector 263, a transimpedance amplifier 264, a receiver chip "RX" 265, a heater stage "TEC/HT" 279 in thermal contact with GMC 270, and a controller "CNT" 275. The electrical ports comprise receiver output (downstream data output) 266 which may be differential, transmitter data input (upstream data input) 277, and module diagnostics port 278 coupled to the controller 275 which may send traffic in either direction. The controller 275 monitors the temperature using a thermocouple or thermistor via line 292; the temperature sensor is denoted with the dot at the end of the line 292. The controller 275 controls the temperature of the GMC 260 by energizing the heater or thermoelectric cooler 279. The controller 275 furthermore communicates with the laser driver chip 274 via line 276: it sets the desired monitor photodiode 273 current $I_{PD}$ or GMC 240 output power via monitor photodiode 282 and sends control signals to the laser driver, such as, laser off and on, and receives the information on the magnitude of the drive current $I_{LD}$ and diagnostic signals, such as, for example, laser fault, over heating, and so on.

The transceiver is operatively configured to receive and emit optical signals through the optical fiber port 261 and electrical data and control signals through electrical ports 266, 277, and 278. Optical signals with wavelengths in the downstream wavelength range are incident through the optical fiber power 261 are routed by the duplexer 262 to the high-speed photodetector 263 where the optical intensity is converted to electrical current and then converted to voltage at the trans-impedance amplifier 264. The analog signal at the exit of the trans-impedance amplifier 264 is amplified and further processed in the receiver 265 before it is routed to the electrical ports 266 associated with the transceiver electrical output. The high-speed photodetector 263, transimpedance-amplifier 264, and the receiver 265 constitute the receiving chain of transmitter 260.

The GMC 270 is driven directly using a laser driver 274 which brings DC bias (operating point) and the AC modulation according to the data input 277. The current output from the monitor photodiode 273 coupled to the GMC 270 is fed to the laser driver 274 as input to an analog feedback loop within the laser driver 274 that maintains the laser output constant over time and temperature.

The longitudinal mode separation $\Delta f_{GMC}$ of the GMC 270 is designed to ensure that only one mode ever appears within the passband of the channel of the external AWG, namely, $\Delta f_{GMC} \geq FWHM$.

The transceiver 260 further comprises a beam splitter 281 and incident-light monitor photodiode 282 which is positioned between the front facet 271 of the GMC 270 and the optical port 261. The beam-splitter 281 couples a fraction of the optical power incident onto the front facet to the incident-monitor photodiode 282. The output from the incident-light monitor photodiode 282 is fed to the controller 275.

In one embodiment, the mode tuning in a WDM-PON transmitter architecture shown in FIG. 2B comprises measuring the photodetector current $I_{PD}$ and simultaneously adjusting the GMC drive current to maintain the $I_{PD}$ at a preset value. The controller further periodically dithers the heater drive power, measures a periodic oscillation in GMC temperature and the resulting periodic oscillation in the returned power $P_1$. The controller is operatively configured to use the time evolution of returned power $P_1$ and the temperature $T_{GMC}$ to maintain the average GMC temperature $\overline{T}_{GMC}$ at a value for which the returned power $P_1$ is maximized. In this way, one longitudinal mode of the GMC will remain within the passband of the array-waveguide array regardless of the ambient temperature. The case of the transceiver 260 is assumed to be at an ambient temperature $T_A$ which is generally different from the GMC 270 temperature $T_{GMC}$.

VIII. Self-Seeded System Embodiments with Faraday Rotation

Figure 3A:
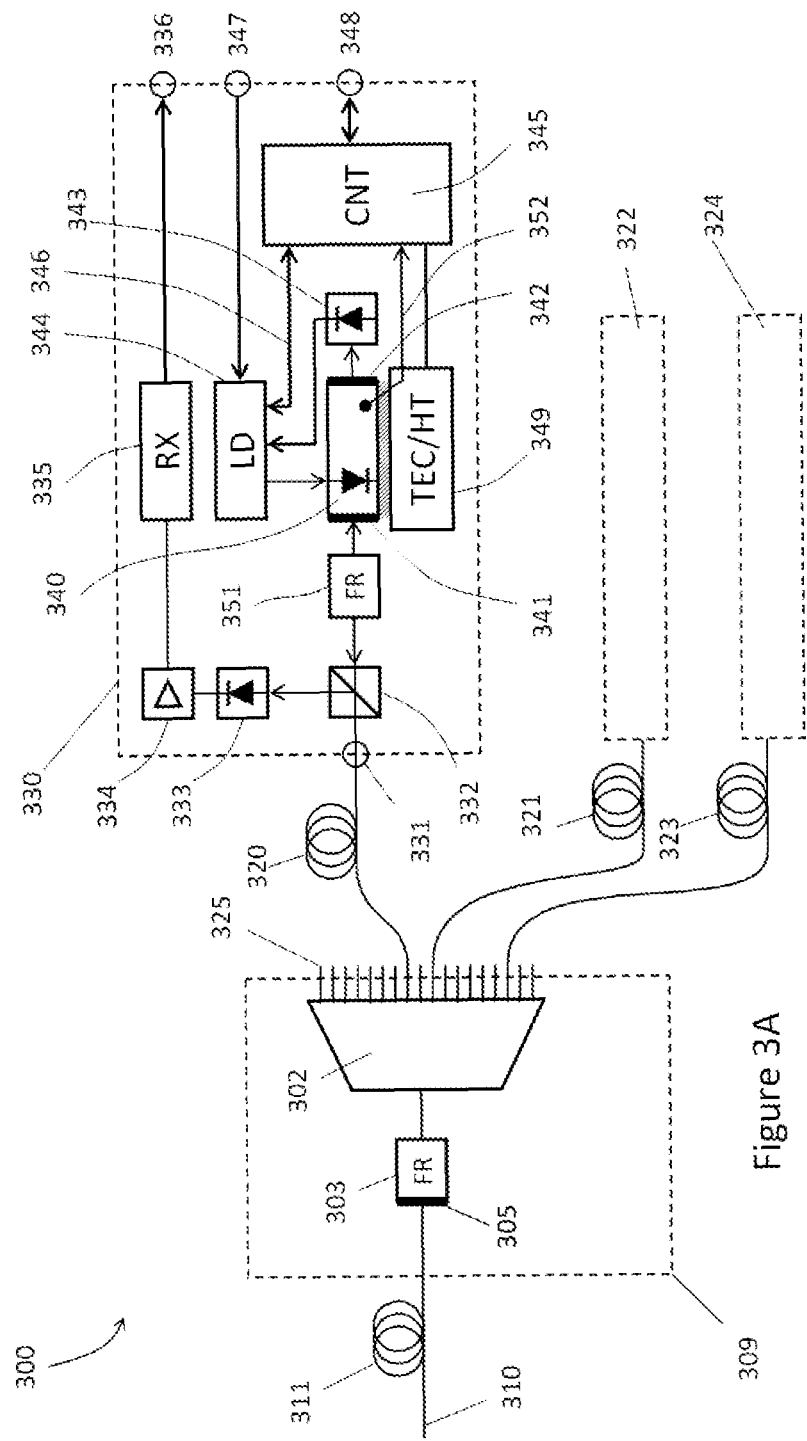
FIG. 3A: One embodiment of transmitter optical source employing GMC mode to AAWG channel tuning based on sensing the laser drive current $I_{LD}$. The transmitter is based on self-seeding with Faraday rotators.
Figure 3B:
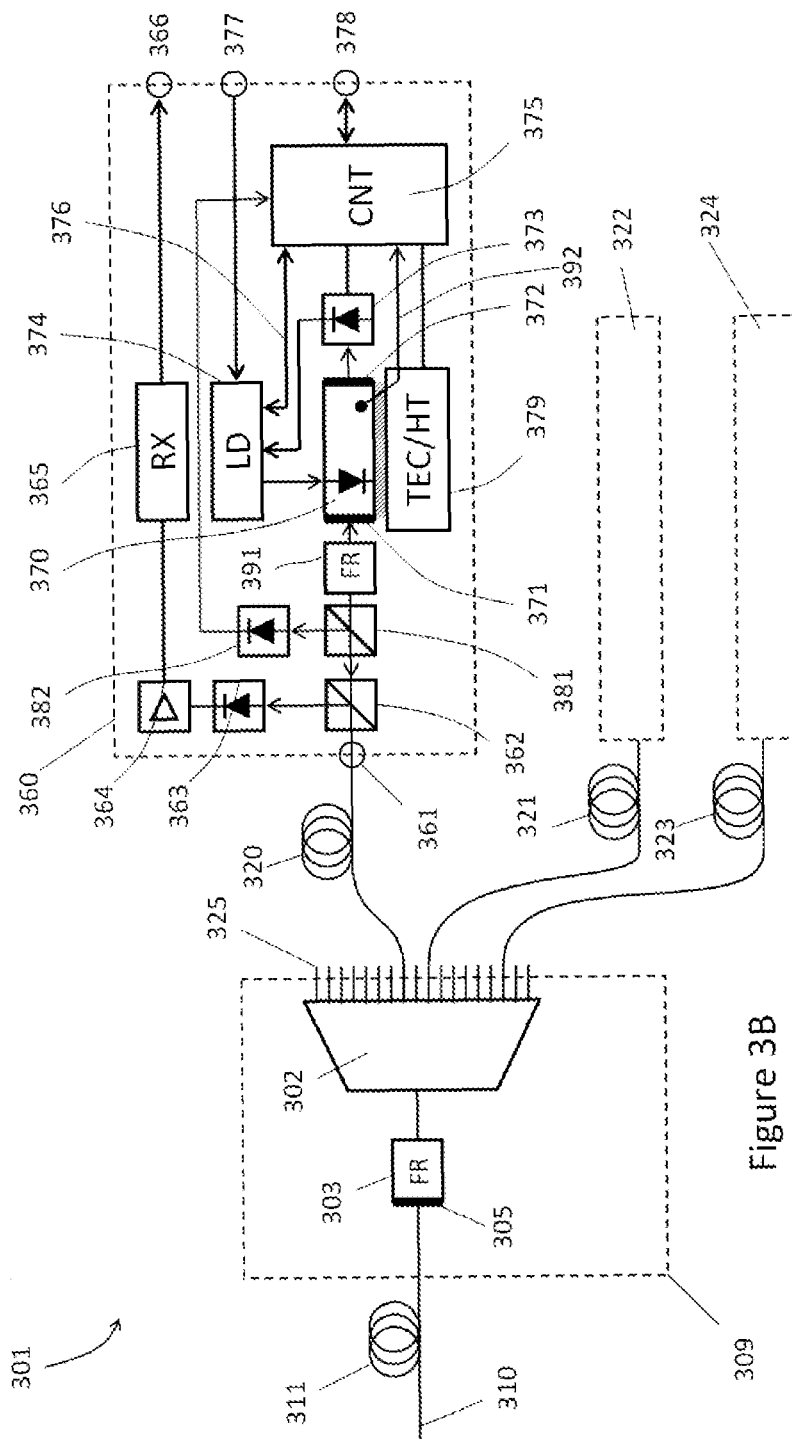
FIG. 3B: One embodiment of transmitter optical source employing GMC mode to AAWG channel tuning based on maximizing the return power $P_1$. The transmitter is based on self-seeding with Faraday rotators.

In one embodiment, illustrated in FIG. 3A, a WDM optical transmitter section 300 of a WDM-PON system comprises a remote node 309 and at least one optical transceiver 330 connected to remote node 309 using a distribution fiber 320. To operate the WDM-PON source, at least one transceiver is required, but FIG. 3A illustrates three optical transceivers 330, 322, and 324 connected to the remote node 309, each transceiver using its own distribution fiber 320, 321, and 323, respectively. FIG. 3B illustrates three optical transceivers 360, 322, and 324 connected to the remote node 309, each transceiver using its own distribution fiber 320, 321, and 323. The distance between the remote node 309 and any of the transceivers 330, 322, and 324 is determined by the available link budget, desired line rate, and dispersion penalty as is well known in the art.

The remote node 309 comprises an array waveguide grating (AWG) 302 with at least one common port and M distribution ports 325, a 45-degree Faraday rotator 303, a third mirror 305. Faraday rotator 303 and mirror 305 constitute the reflector assembly of this embodiment. In another embodiment (not shown), the reflector assembly includes an optical coupler as well as Faraday rotator 303 and mirror 305. The AWG 302 is an optical multiplexer/demultiplexer which demultiplexes wavelength-division multiplexed optical signals entering common port into M signals at M different distribution ports 325 with M different wavelengths.

The Faraday Rotating Mirror comprising third mirror 305 and the Faraday rotator 303 is disposed at the end of a fiber. Such fiber mirrors are commercially available from a number of manufacturers. The reflectivity spectrum of the third mirror has high reflection coefficient, greater than 90% over the entire upstream frequency (wavelength) band.

In one embodiment, the transceiver 330 comprises GMC, duplexer, receiver chain and transmitting chain, including the heater are enclosed into a single housing, such as an SFP or XFP module, but may also be only partially packaged without departing from the spirit of the invention.

There are two transceiver embodiments that feature mode tuning. In FIG. 3A the tuning is done using $I_{LD}$ and in FIG. 3B using returned optical power $P_1$. The remote node and trunk fiber are numbered identically in FIGS. 3A and 3B to stress that either one of the transceivers shown in FIG. 3A and FIG. 3B may be used with the same arrangement in the remote node.

VIII.1 Sensing Laser Drive Current (B1)

Architecture 300 uses at least one transceiver 330 which comprises an optical port 331 which may be connectorized, electrical ports 336, 347, and 348, a duplexer 332 optically coupled to the optical port 331, GMC 340 which includes front facet mirror 341 and back-facet mirror 342, a back-facet monitor photodiode 343, a laser driver chip "LD" 344, a high-speed photodetector 333, a transimpedance amplifier 334, a receiver chip "RX" 335, a heater stage "TEC/HT" 349 in thermal contact with GMC 340, and a controller "CNT" 345. A Faraday rotator 351 is disposed between the duplexer 332 and the GMC 340. The electrical ports comprise receiver output (downstream data output) 336 which may be differential, transmitter data input (upstream data input) 347 which also may be differential, and module diagnostics port 348 coupled to the controller 345 which may send traffic in either direction. The controller 345 monitors the temperature using a thermocouple or thermistor via line 352; the temperature sensor is denoted with the dot at the end of the line 352. The controller 345 controls the temperature of the GMC 340 by energizing the heater or thermoelectric cooler 349. The controller 345 communicates with the laser driver chip 344 via line 246: it sets the desired monitor photodiode 343 current $I_{PD}$ (effectively GMC 340 output power) and sends control signals to the laser driver 344, such as, laser off and on, and receives the information on the magnitude of the drive current $I_{LD}$ and diagnostic signals, such as, for example, laser fault, over heating, and so on.

The transceiver 330 is operatively configured to receive and emit optical signals through the optical fiber port 331 and electrical data and control signals through electrical ports 336, 347, and 348. Optical signals with wavelengths in the downstream wavelength range are incident through the optical fiber power 331 are routed by the duplexer 332 to the high-speed photodetector 333 where the optical intensity is converted to electrical current and then converted to voltage at the trans-impedance amplifier 334. The analog signal at the exit of the trans-impedance amplifier 334 is amplified and further processed in the receiver 335 before it is routed to the electrical ports 336 associated with the transceiver electrical output. The photodetector 333, transimpedance-amplifier 334, and the receiver 335 constitute the receiving chain of transmitter 330.

The GMC 340 is driven directly using a laser driver 344 which brings DC bias (operating point) and the AC modulation according to the data input 347. The current output from the monitor photodiode 343 coupled to the GMC 340 is fed to the laser driver 344 as input to the analog feedback loop that maintains the laser output constant over time and temperature.

The longitudinal mode separation $\Delta f_{GMC}$ of the GMC 340 is designed to ensure that only one mode ever appears within the passband of the channel of the external AWG, namely, $\Delta f_{GMC} \geq FWHM$.

In one embodiment, the mode tuning in a WDM-PON transmitter architecture shown in FIG. 3A comprises measuring the monitor photodetector 343 current $I_{PD}$ and simultaneously adjusting the GMC 340 drive current $I_{LD}$ to maintain the $I_{PD}$ at a preset value. The controller 345 further periodically dithers the heater 349 drive power, measures a periodic oscillation in GMC temperature 352 and the resulting periodic oscillation in the GMC drive current (ED). The controller 345 is operatively configured to use the time evolution of GMC drive current $I_{LD}$ and the temperature $T_{GMC}$ to maintain the average GMC temperature $T_{GMC}$ at a value for which the slope $dI_{LDO}/dT$ is fixed to a non-positive value and negative curvature $d^2I_{LDO}/dT^2 < 0$ (see shape of $I_{LD}$ where $P_4$ is maximal in FIG. 5A). An alternative is setting the $I_{LD}$ is at a preset fraction of the value between its $\min(I_{LD})$ and $\max(I_{LD})$. In this way, one longitudinal mode of the GMC will remain within the passband of the array-waveguide array regardless of the ambient temperature. The case of the transceiver 330 is assumed to be at an ambient temperature $T_A$ which is generally different from the GMC 340 temperature $T_{GMC}$.

VIII.2 Sensing Return Optical Power (B2)

Architecture 301 uses at least one transceiver 360 which comprises an optical port 361 which may be connectorized, electrical ports 366, 377, and 378, a duplexer 362 optically coupled to the optical port 361, a gain and modulation chip (GMC) 370 which includes front facet mirror 371 and back-facet mirror 372, a back-facet monitor photodiode 373, a laser driver chip "LD" 374, a high-speed photodetector 363, a transimpedance amplifier 364, a receiver chip "RX" 365, a heater stage "TEC/HT" 379 in thermal contact with GMC 370, and a controller "CNT" 375. A Faraday rotator 391 is disposed between the coupler 381 and the GMC 370. The electrical ports comprise receiver output (downstream data output) 366 which may be differential, transmitter data input (upstream data input) 377, and module diagnostics port 378 coupled to the controller 375 which may send traffic in either direction. The controller 375 monitors the temperature using a thermocouple or thermistor via line 392; the temperature sensor is denoted with the dot at the end of the line 392. The controller 375 controls the temperature of the GMC 360 by energizing the heater or thermoelectric cooler 379. The controller 375 furthermore communicates with the laser driver chip 374 via line 376: it sets the desired monitor photodiode 373 current $I_{PD}$ or GMC output power and sends control signals to the laser driver 374, such as, laser off and on, and receives the information on the magnitude of the drive current $I_{LD}$ and diagnostic signals, such as, for example, laser fault, over heating, and so on.

The transceiver is operatively configured to receive and emit optical signals through the optical fiber port 361 and electrical data and control signals through electrical ports 366, 377, and 378. Optical signals with wavelengths in the downstream wavelength range are incident through the optical fiber port 361 are routed by the duplexer 362 to the high-speed photodetector 363 where the optical intensity is converted to electrical current and then converted to voltage at the trans-impedance amplifier 364. The analog signal at the exit of the trans-impedance amplifier 364 is amplified and further processed in the receiver 365 before it is routed to the electrical ports 366 associated with the transceiver electrical output. The high-speed photodetector 363, transimpedance-amplifier 364, and the receiver 365 constitute the receiving chain of transmitter 360.

The GMC 370 is driven directly using a laser driver 374 which brings DC bias (operating point) and the AC modulation according to the data input 377. The current output from the monitor photodiode 373 coupled to the GMC 370 is fed to the laser driver 374 as input to the analog feedback loop that maintains the laser output constant over time and temperature.

The longitudinal mode separation $\Delta f_{GMC}$ of the GMC 370 is designed to ensure that only one mode ever appears within the passband of the channel of the external AWG, namely: $\Delta f_{GMC} \geq FWHM$.

The transceiver 360 further comprises a beam splitter 381 and incident-monitor photodiode 382 which is positioned between the front facet 371 of the GMC 370 and the optical port 361. The beam-splitter 381 couples a fraction of the optical power $P_1$ incident onto the front facet to the incident-monitor photodiode 382. The output from the incident-monitor photodiode 382 is fed to the controller 375.

In one embodiment, the mode tuning in a WDM-PON transmitter architecture shown in FIG. 3B comprises measuring the photodetector current $I_{PD}$ and simultaneously adjusting the GMC drive current to maintain the $I_{PD}$ at a preset value. The controller further periodically dithers the heater drive power, measures a periodic oscillation in GMC temperature and the resulting periodic oscillation in the returned power $P_1$. The controller is operatively configured to use the time evolution of returned power $P_1$ and the temperature $T_{GMC}$ to maintain the average GMC temperature $T_{GMC}$ at a value for which the returned power $P_1$ is maximized. In this way, one longitudinal mode of the GMC will remain within the passband of the array-waveguide array regardless of the ambient temperature. The case of the transceiver 360 is assumed to be at an ambient temperature $T_A$ which is generally different from the GMC 370 temperature $T_{GMC}$.

IX. BLS-Seeded System Embodiments

Figure 7A:
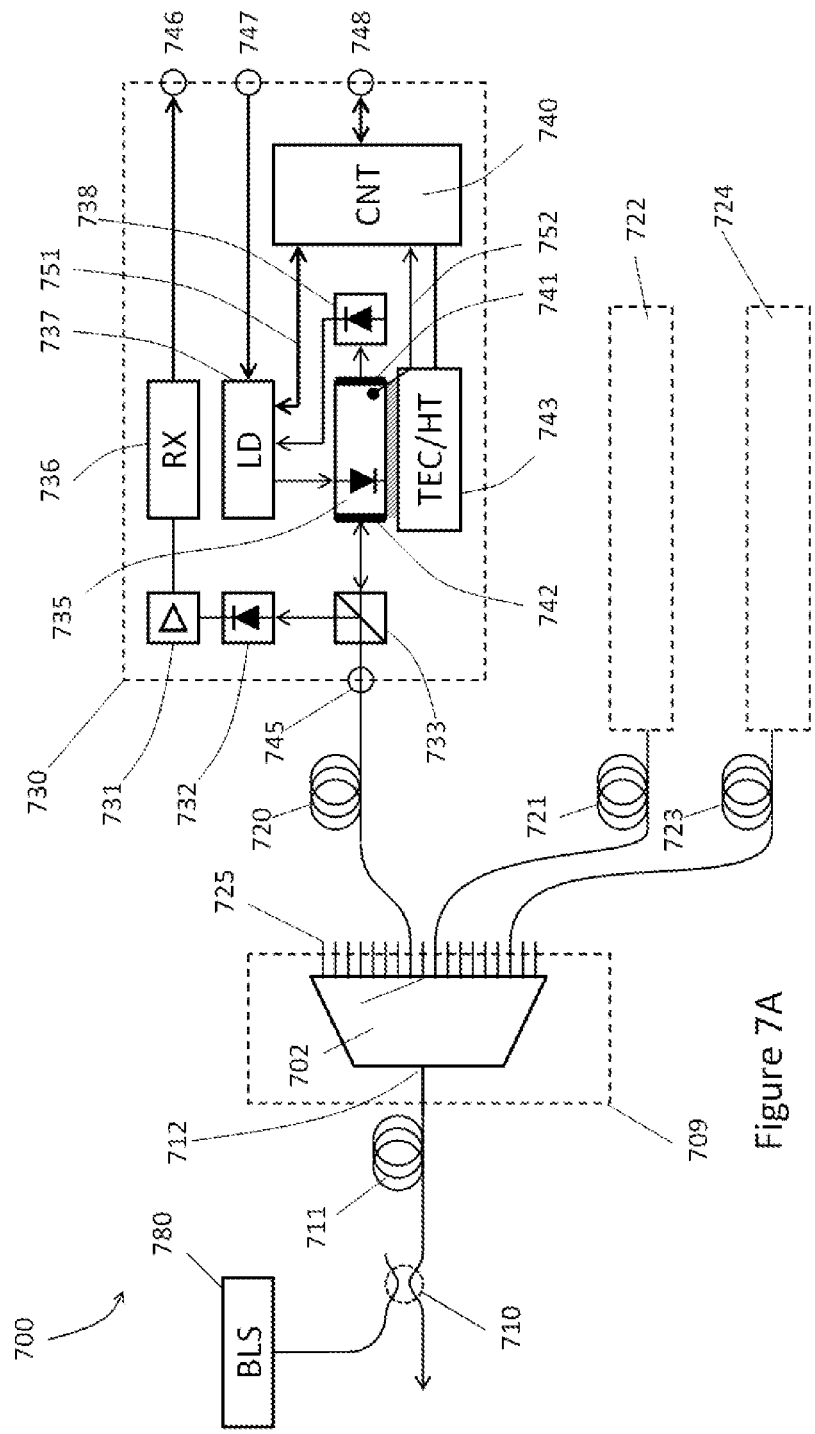
FIG. 7A: One embodiment of a BLS-seeded transmitter optical source employing GMC mode to AAWG channel tuning based on sensing the laser drive current $I_{LD}$.
Figure 7B:
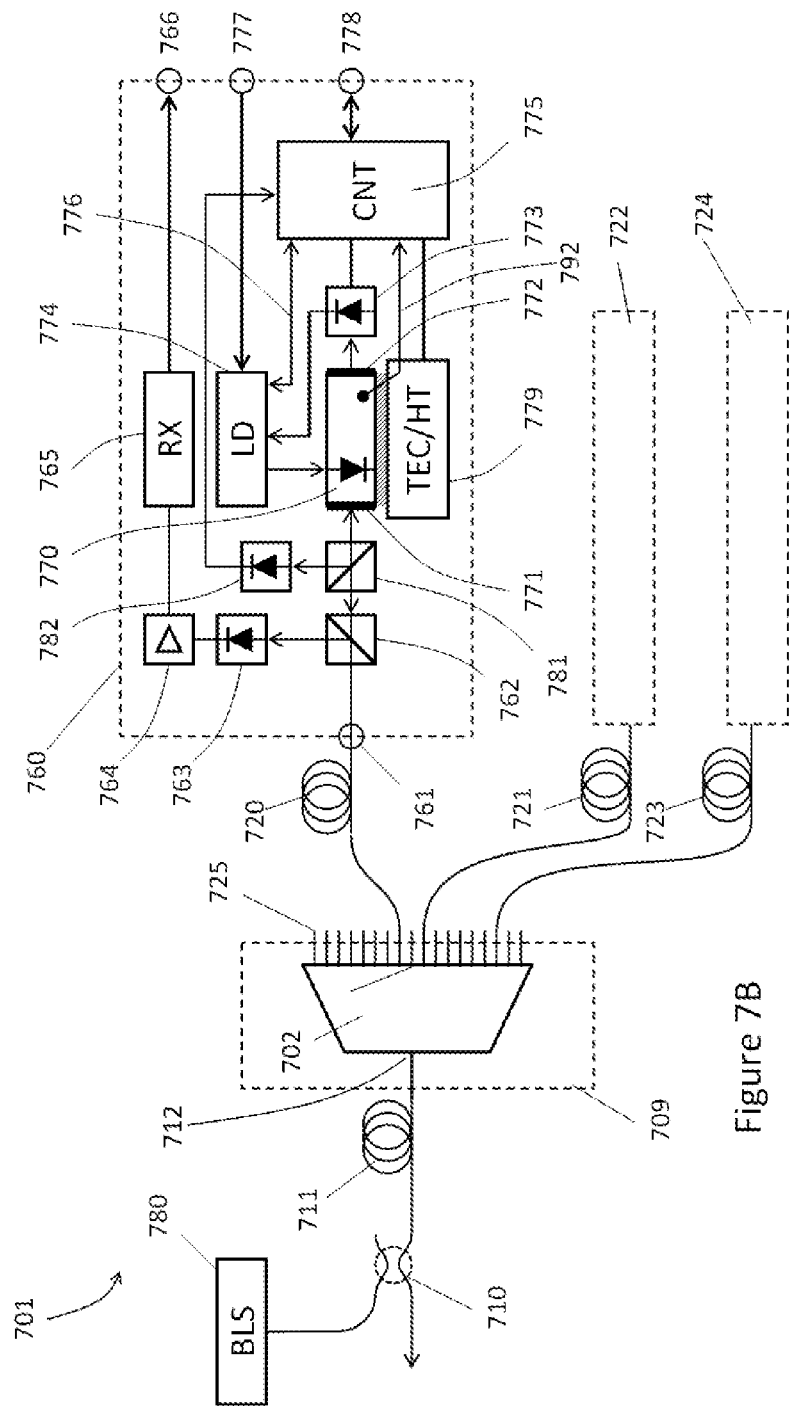
FIG. 7B: One embodiment of a BLS-seeded transmitter optical source employing GMC mode to AAWG channel tuning based on maximizing the return power $P_2$.

In one embodiment, illustrated in FIG. 7A, a WDM optical transmitter section 700 of a WDM-PON system comprises a remote node 709 and at least one optical transceiver 730 connected to remote node 709 using a distribution fiber 720. To operate the WDM-PON source, at least one transceiver is required, but FIG. 7A illustrate three optical transceivers 730, 722, and 724 connected to the remote node 709, each transceiver using its own distribution fiber 720, 721, and 723, respectively. FIG. 7B illustrates three optical transceivers 760, 722, and 724 connected to the remote node 709, each transceiver using its own distribution fiber 720, 721, and 723. The distance between the remote node 709 and any of the transceivers 730 or 760, 722, and 724 is determined by the available link budget, desired line rate, and dispersion penalty as is well known in the art.

The remote node 709 comprises an array waveguide grating (AWG) 702 with at least one common port 712 and M distribution ports 725. The AWG 702 is an optical multiplexer/demultiplexer which demultiplexes wavelength-division multiplexed optical signals entering common port 712 into M signals at M different distribution ports 725 with M different wavelengths.

The AWG common port 712 is coupled to trunk fiber 711 which is connected to the central office. A broadband light source 780 (BLS) is coupled to trunk fiber 711 via optical coupler 710. The BLS is shown on the end of trunk fiber 711 distal from the common port 712, while it may also be located on the proximal end depending on whether transceiver 730 is on the client side or the central office side. The light emitted from the BLS is directed to the AWG 702, spectrally sliced, and via the distribution fiber 720 seeds the transceiver 730.

In one embodiment, the transceiver 730 comprises GMC, duplexer, receiver chain and transmitting chain, including the heater are enclosed into a single housing, such as an SFP or XFP module, but may also be only partially packaged without departing from the spirit of the invention.

There are two transceiver embodiments that feature mode tuning. In FIG. 7A the tuning is done using $I_{LD}$ and in FIG. 7B using emitted optical power $P_2$. The remote node and trunk fiber are numbered identically in FIGS. 7A and 7B to stress that either one of the transceivers shown in FIG. 7A and FIG. 7B may be used with the same arrangement in the remote node and central office.

VII.1. Sensing Laser Drive Current (C1)

Architecture 700 uses at least one transceiver 730 which comprises an optical port 745 which may be connectorized, electrical ports 746, 747, and 748, a duplexer 733 optically coupled to the optical port 745, GMC 735 which includes front facet mirror 742 and back-facet mirror 741, a back-facet monitor photodiode 738, a laser driver chip "LD" 737, a high-speed photodetector 732, a transimpedance amplifier 731, a receiver chip "RX" 736, a heater stage "TEC/HT" 743 in thermal contact with GMC 735, and a controller "CNT" 740. The electrical ports comprise receiver output (downstream data output) 746 which may be differential, transmitter data input (upstream data input) 747 which also may be differential, and module diagnostics port 748 coupled to the controller 740 which may send traffic in either direction. The controller 740 monitors the temperature using a thermocouple or thermistor via line 752; the temperature sensor is denoted with the dot at the end of the line 752. The controller 740 controls the temperature of the GMC 735 by energizing the heater or thermoelectric cooler 743. The controller 740 communicates with the laser driver chip 737 via line 751: it sets the desired monitor photodiode current $I_{PD}$ or GMC output power and sends control signals to the laser driver, such as, laser off and on, and receives the information on the magnitude of the drive current $I_{LD}$ and diagnostic signals, such as, for example, laser fault, over heating, and so on.

The transceiver is operatively configured to receive and emit optical signals through the optical fiber port 745 and electrical data and control signals through electrical ports 746, 747, and 748. Optical signals with wavelengths in the downstream wavelength range are incident through the optical port 745 are routed by the duplexer 733 to the high-speed photodetector 732 where the optical intensity is converted to electrical current and then converted to voltage at the trans-impedance amplifier 731. The analog signal at the exit of the trans-impedance amplifier 731 is amplified and further processed in the receiver 736 before it is routed to the electrical ports 746 associated with the transceiver electrical output. The photodetector 732, transimpedance-amplifier 731, and the receiver 736 constitute the receiving chain of transmitter 730.

The GMC 735 is driven directly using a laser driver 737 which brings DC bias (operating point) and the AC modulation according to the data input 747 as is well known in the art. The current output from the monitor photodiode 738 coupled to the GMC is fed to the laser driver 737 as input to the analog feedback loop that maintains the laser output constant over time and temperature.

The longitudinal mode separation $\Delta f_{GMC}$ of the GMC 735 is designed to ensure that only one mode ever appears within the passband of the channel of the external AWG, namely, $\Delta f_{GMC} \geq FWHM$.

In one embodiment, the mode tuning in a WDM-PON transmitter architecture shown in FIG. 7A comprises measuring the monitor photodetector current $I_{PD}$ and simultaneously adjusting the GMC drive current $I_{LD}$ to maintain the $I_{PD}$ at a preset value. The controller 740 further periodically dithers the heater 743 drive power, measures a periodic oscillation in GMC temperature and the resulting periodic oscillation in the GMC drive current (ED). The controller 740 is operatively configured to use the time evolution of GMC drive current $I_{LD}$ and the temperature $T_{GMC}$ to maintain the average GMC temperature $T_{GMC}$ at a value for which the slope $dI_{LDO}/dT$ is fixed zero and the curvature is positive (see FIG. 5B for clarification). The case of the transceiver 730 is assumed to be at an ambient temperature $T_A$ which is generally different from the GMC 735 temperature $T_{GMC}$.

In one embodiment, the monitoring of the GMC emissied light is done using a monitor photodiode mounted so that it captures a portion of the optical power emitted from the front facet (rather than from the back facet). In this case, the first control loop uses the front-facet monitor diode output and the second control loop searches for the minimum in the GMC operating current as disclosed above.

VII.2. Sensing Emitted Optical Power (C2)

Architecture 701 uses at least one transceiver 760 which comprises an optical port 761 which may be connectorized, electrical ports 766, 777, and 778, a duplexer 762 optically coupled to the optical port 761, a gain and modulation chip (GMC) 770 which includes front facet mirror 771 and back-facet mirror 772, a back-facet monitor photodiode 773, a laser driver chip "LD" 774, a high-speed photodetector 763, a transimpedance amplifier 764, a receiver chip "RX" 765, a heater stage "TEC/HT" 779 in thermal contact with GMC 770, and a controller "CNT" 775. The electrical ports comprise receiver output (downstream data output) 766 which may be differential, transmitter data input (upstream data input) 777, and module diagnostics port 778 coupled to the controller 775 which may send traffic in either direction. The controller 775 monitors the temperature using a thermocouple or thermistor via line 792; the temperature sensor is denoted with the dot at the end of the line 792. The controller 775 controls the temperature of the GMC 760 by energizing the heater or thermoelectric cooler 779. The controller 775 furthermore communicates with the laser driver chip 774 via line 776: it sets the desired monitor photodiode current $I_{PD}$ or GMC output power and sends control signals to the laser driver, such as, laser off and on, and receives the information on the magnitude of the drive current $I_{LD}$ and diagnostic signals, such as, for example, laser fault, over heating, and so on.

The transceiver is operatively configured to receive and emit optical signals through the optical fiber port 761 and electrical data and control signals through electrical ports 766, 777, and 778. Optical signals with wavelengths in the downstream wavelength range are incident through the optical fiber power 761 are routed by the duplexer 762 to the high-speed photodetector 763 where the optical intensity is converted to electrical current and then converted to voltage at the trans-impedance amplifier 764. The analog signal at the exit of the trans-impedance amplifier 764 is amplified and further processed in the receiver 765 before it is routed to the electrical ports 766 associated with the transceiver electrical output. The photodetector 763, transimpedance-amplifier 764, and the receiver 765 constitute the receiving chain of transmitter 760.

The GMC 770 is driven directly using a laser driver 774 which brings DC bias (operating point) and the AC modulation according to the data input 777 as is well known in the art. The current output from the monitor photodiode 773 coupled to the GMC is typically fed to the laser driver as input to the analog feedback loop that maintains the laser output constant over time and temperature.

The longitudinal mode separation $\Delta f_{GMC}$ of the GMC 770 is designed to ensure that only one mode ever appears within the passband of the channel of the external AWG: $\Delta f_{GMC} \geq FWHM$.

The transceiver 760 further comprises a beam splitter 781 which is positioned between the front facet 771 of the GMC 770 and the optical port 761 and incident-monitor photodiode 782. The beam-splitter 781 couples a fraction of the optical power emitted $P_2$ from the GMC 770 to the incident-monitor photodiode 782. The output from the monitor photodiode 782 is fed to the controller 775.

In one embodiment, the mode tuning in a WDM-PON transmitter architecture shown in FIG. 7B comprises measuring the photodetector current $I_{PD}$ and simultaneously adjusting the GMC drive current to maintain the $I_{PD}$ at a preset value. The controller further periodically dithers the heater drive power, measures a periodic oscillation in GMC temperature and the resulting periodic oscillation in the emitted power $P_2$. The controller is operatively configured to use the time evolution of emitted power $P_2$ and the temperature $T_{GMC}$ to maintain the average GMC temperature $\overline{T}_{GMC}$ at a value for which the emitted power $P_2$ is minimized. In this way, one longitudinal mode of the GMC will remain within the passband of the array-waveguide array regardless of the ambient temperature. The case of the transceiver 760 is assumed to be at an ambient temperature $T_A$ which is generally different from the GMC 770 temperature $T_{GMC}$.

X. Real-Time Mode-Tuning Method

The mode adjustment approaches disclosed in this application rely on finding the value of GMC temperature that corresponds to a maximum, a minimum, or a value in between of a response (current or optical power) versus temperature. There is more than one way of implementing this type of control. This application discloses one possible way.

X.1 One Embodiment of a Method for Mode Tuning

In this embodiment, the power drive to the heater or the thermoelectric cooler is alternated between two values that correspond to two temperatures separated by a small value, for example, 1° C. Namely, the power drive to the heater/TEC is a periodically modulating signal with peak-to-peak magnitude $\Delta P_{HT}$ superimposed on a constant value $\overline{P}_{HT}$. The periodic function is arbitrary, but in this implementation a square-wave signal with repetition period $t_{HT}$ is used. The constant drive $\overline{P}_{HT}$ results in an average temperature $\overline{T}_{GMC}$ of the GMC, while the peak-to-peak value $\Delta P_{HT}$ and the period $t_{HT}$ of the square-wave modulation determines the shape and the peak-to-peak amplitude of the temperature oscillation $\Delta T_{GMC}(t)$. If the period of the square-wave $t_{HT}$ is set to be comparable to the thermal time constant $\tau_{HT}$ of the GMC and the package, the result will be a smooth near-sinusoidal variation in $\Delta T_{GMC}(t)$. Adjusting the period $t_{HT}$, shape and the amplitude $\Delta P_{HT}$ of the heating power to produce sinusoidal, square-wave or other temperature variation does not depart from the invention.

The temperature oscillation $T_{GMC}(t)$ produces an oscillating wavelength shift and through it a change in the response (laser drive current or measured optical power) is then detected. Based on the data shown in FIGS. 5A and 5B, stabilization and locking of a mode to the AWG channel passband in a self-seeded (FIG. 5A) or BLS-seeded (FIG. 5B) system is based on finding $T_{GMC}$ for which an extremum is exhibited in the response. The response, denoted with $R(T_{GMC})$, is either the laser drive current $R(T_{GMC})=I_{LD}(T_{GMC})$ or measured optical power $R(T_{GMC})=P_X(T_{GMC})$, where X=1 for self-seeded and X=2 for BLS-seeded system. As shown in FIG. 5A, in a self-seeding system, the maximum in the output power $P_4$ does not exactly correspond to a minimum in $I_{LD}$. In this case, it is necessary to search for a specific predetermined slope in the $I_{LD}(T_{GMC})$ relationship rather than for the extremum where slope equals zero. This type of control can be implemented in the same manner as searching for zero slope one. This embodiment will be disclosed below.

The second control loop includes evaluating the slope of the response $R(T_{GMC})$ where one needs to dither the instantaneous temperature $T_{GMC}(t)$ around an average temperature set point, monitor the time evolution of the response $R(t)$, and observe the correlation $C_{RT}$ between the instantaneous temperature difference $\Delta T_{GMC}(t)=T_{GMC}(t)-\overline{T}_{GMC}$ and the instantaneous response difference $\Delta R(t)=R(t)-R(\overline{T}_{GMC})$. The correlation is performed in real time by integrating/summing the product $C_{RT}=\Sigma\Delta T(t)\Delta R(t)$ over a certain amount of time. From the correlation $C_{RT}$ it is straightforward to estimate the temperature for which $R(T_{GMC})$ is at an extremum or has a slope: When $C_{RT}>0$, the response grows with temperature, and when $C_{RT}<0$, it reduces. Due to the presence of noise in the measurement, one may preset a boundary value for the correlation $|C_{RT}| \leq C_{EXT}$, for which we shall treat the slope as being substantially equal to zero. If one were seeking a maximum, the second control loop should be designed so that when $C_{RT} \geq C_{EXT}$, the heater drive is increased to step up the value of $\overline{T}_{GMC}$, if $C_{RT} \leq -C_{EXT}$, the heater drive is decreased to step down the value of $\overline{T}_{GMC}$, and if $|C_{RT}| \leq C_{EXT}$, the heater drive remains unchanged. If we are seeking for a minimum, the second control loop should be designed so that when $C_{RT} \geq C_{EXT}$, the heater drive is decreased to step down the value of $\overline{T}_{GMC}$, if $C_{RT} \leq -C_{EXT}$, the heater drive is increased to step up the value of $\overline{T}_{GMC}$, and if $|C_{RT}| \leq C_{EXT}$, the heater drive remains unchanged.

Note that $C_{EXT}$ may be zero. Additionally, one can also use this method to lock response R at an arbitrary slope by forcing the second loop to maintain a temperature $T_{GMC}$ where the correlation has a fixed positive or negative value $C_0$, namely, $|C_{RT}+C_0| \leq C_{EXT}$. This type of control loop is applicable to mode tuning in self-seeded systems using GMC drive current $I_{LD}$ or return optical power $P_1$, as well as mode tuning in BLS-seeded systems using GMC drive current $I_{LD}$ or emitted optical power $P_2$.

X.2 Circuit Implementation of Method for Mode Tuning

Figure 8:
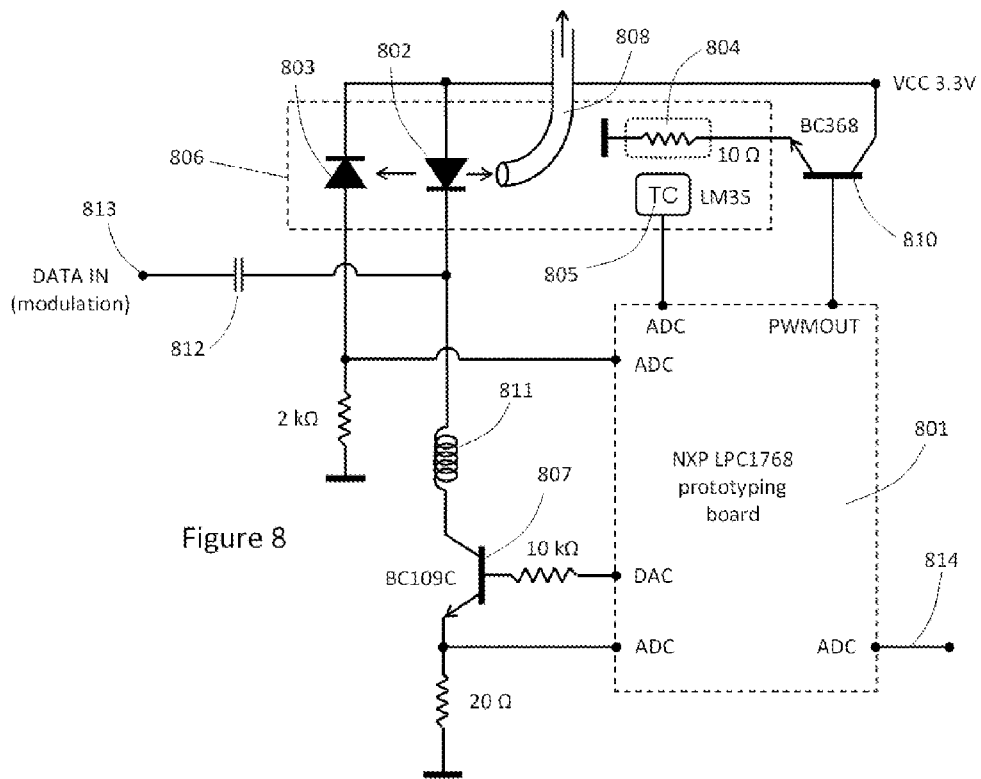
FIG. 8: One embodiment of the control circuit used to manage both the first and second control loops.

The above-disclosed method for mode tuning may be implemented using analog or digital control as is well known in the art of automatic control. FIG. 8 illustrates one possible implementation of the control circuits 800 that perform both the first and the second control loops.

The control circuit 800 comprises a microprocessor 801 which features a number of inputs, noted A-to-D converters (ADC), and outputs, noted as D-to-A converters (DAC). One of the outputs allows pulse-width modulation output noted as PWMOUT. This type of controller or similar controller are available publicly, the unit used in this implementation is manufactured by NXP Semiconductors headquartered in Eindhoven, The Netherlands. Fabry-Perot laser 802 with anti-reflective coating on its front facet is the GMC co-packaged with a monitor photodiode 803 and in thermal contact with a resistive heater 804 and a thermometer 805. In this implementation, temperature measurement is performed using a temperature sensor LM35 (805) manufactured by Texas Instruments, Dallas, Tex. The thermometer 805, the heater 804, the GMC 802, and the monitor photodiode 803 are co-located and in thermal contact illustrated with the box 806. A portion of the light emitted by the Fabry-Perot laser 802 is coupled into an optical fiber 808 and a portion is captured by the monitor photodiode 803. The GMC 802 is powered by a 3.3—V power supply (VCC) and the current $I_{LD}$ through it controlled by NPN transistor 807 whose base bias is controlled by an output from the controller 801 (through a series 10 kohm resistor). The current $I_{LD}$ passing through the GMC 802 is measured by the controller 801 as voltage drop across the 20-ohm resistor in the emitter of the transistor 807. The monitor photodiode is powered using a 3.3-V power supply VCC and its photocurrent $I_{PD}$ measured by the controller 801 as voltage drop across a 2-kohm resistor. Note that this is a simple conversion of current to voltage using a resistor, where one could use a separate transimpedance amplifier in the place of the resistor. The temperature $T_{GMC}$ of the laser 802 is measured by the temperature sensor 805 and its output is fed to the controller 801. The current through the resistive heater 804 heating is controlled by transistor 810 whose base is driven by the pulse-width modulation output of the controller 801. The resistive heater 804 in this implementation has resistance 10 ohms. The measurements of optical power $P_1$ and $P_2$ are fed to one of the analog inputs on the controller and indicated with 814. The data input 813 and the DC bias (via transistor 807) are brought to the GMC 802 via a bias-tee comprising of a capacitor 812 and an inductor 811.

In this architecture the microprocessor 801 manages both control loops: the first loop comprises of measuring the current $I_{PD}$ through the photodetector 803, comparing it to a reference $I_{PD0}$ set internally within the microprocessor and adjusting the laser drive current $I_{LD}$ in order to make the difference between the preset value $I_{PD0}$ and the measured value $I_{PD}$ substantially zero. The second loop comprises of controlling the drive to the heater 804: providing, using pulse-width modulated signal, an average heating power $\overline{P}_{HT}$ with a square-wave heating power modulation $\Delta P_{HT}(t)$ with a specified square-wave repetition period. The average heating power results in the GMC average temperature while the square-wave modulation results in a smooth and periodic temperature variation $\Delta T_{GMC}(t) T_{GMC}(t) - \overline{T}_{GMC}$ superimposed on top of the average temperature $\overline{T}_{GMC}$. The controller 801 controls the temperature dither $T_{GMC}(t)$, measures the response R(t), performs the correlation computation $C_{RT}$, and then makes appropriate corrections to the average temperature $\overline{T}_{GMC}$ as described in section VIII.1.

X.3 Mode Tuning Principle Illustrated on Measured Data

Figure 9:
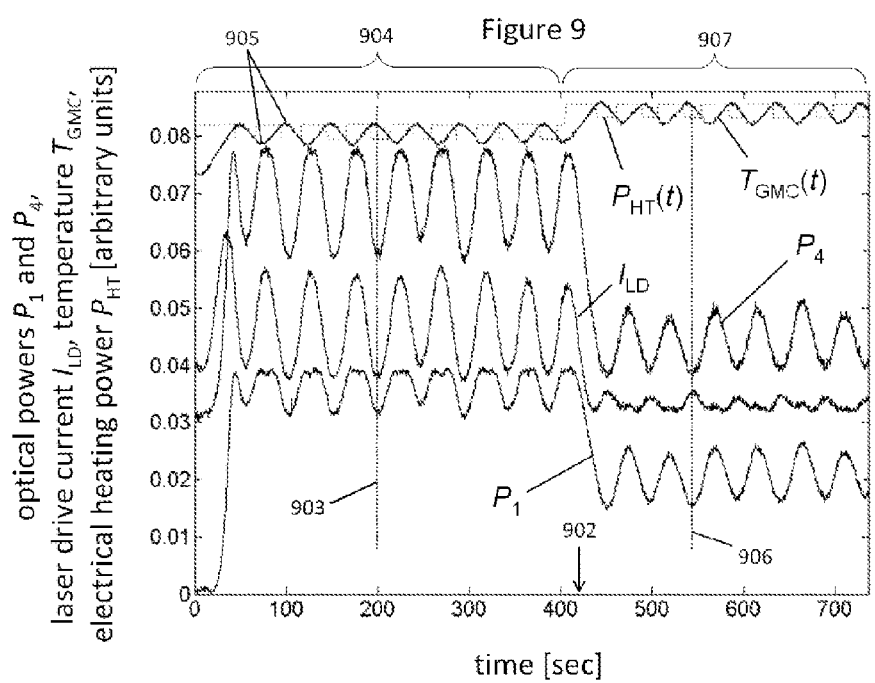
FIG. 9: Experimental illustration of the signals used in mode tuning.

In one embodiment, the controller circuit 800 is inserted into the self-seeded system shown in FIG. 4A and is contained in the box 404. In one embodiment, an output from a photodetector circuit (not shown) detecting return optical power $P_1$ is connected to the terminal 814 of the microprocessor 801. The experimental results obtained on this implementation are shown in FIG. 9. In another embodiment, the controller circuit 800 is inserted into the BLS-seeded system 450 shown in FIG. 4B and is contained in box 454. In one embodiment, an output from a photodetector circuit (not shown) detecting emission optical power $P_2$ is connected to the terminal 814 of the microprocessor 801.

In FIG. 9, the horizontal axis is time and the vertical axis shows the GMC current $I_{LD}(t)$, the output power $P_4(t)$, the reflected power $P_1(t)$, the GMC temperature $T_{GMC}(t)$, and the heating power $P_{HT}(t)$. The quantities have been scaled to fit on the same chart, hence the units are arbitrary. The monitor phototdetector current $I_{PD}$ was kept constant throughout. The heating power $P_{HT}(t)$ varies according to a square wave around an average value $\overline{P}_{HT}$. The heating power modulation $\Delta P_{HT}(t)$ is a square-wave with an approximate modulation period of 50 seconds. The average heating power $P_{HT}$ changed from the initial value in time interval 904 to a higher value during interval 907. The resulting $T_{GMC}(t)$ has a near sinusoidal variation which can be described as an average temperature $\overline{T}_{GMC}$ with modulation $\Delta T_{GMC}(t)$, the average temperature $\overline{T}_{GMC}$ being different in the two time intervals (904 and 907) with different heating power: interval 907 the temperature $\overline{T}_{GMC}$ is slightly higher than in interval 904. This increase in the average temperature $\hat{T}_{GMC}$ is responsible for the reductions in the average output power $\overline{P}_4$, average reflected power $\overline{P}_1$, and average drive current $\overline{I}_{LD}$. The bar on the variables means that these values are averaged over the square-wave period of the heating drive.

The behavior of the measured quantities in FIG. 9 is explained with the help of FIG. 5A: The average temperature $\overline{T}_{GMC}$ during interval 904 approximately corresponds to the temperature 513, while the average temperature $\overline{T}_{GMC}$ during interval 907 approximately corresponds to a temperature slightly above temperature 514 in FIG. 5A. It is clear that an increase in temperature $\overline{T}_{GMC}$ just above the point 512 will make the correlation between the oscillatory part of the drive current $I_{OSC}(t)$ and the temperature $T_{GMC}(t)$ positive (the current increases with temperature). This is confirmed in FIG. 9 where during the time interval 907 the small positive bumps in $I_{LD}(t)$ are correlated with the temperature. However, during the interval 904, at time 903 it is visible that the correlation between $I_{OSC}(t)$ and $T_{GMC}(t)$ is negative.

If we were trying to find the minimum of the drive current $I_{OSC}(t)$, detecting negative correlation in interval 904 would cause the microprocessor to slightly increase the average heater drive $\overline{P}_{HT}$ in an attempt to reach a point where the $I_{OSC}$ is at a minimum—the interval 907 is evidently very close if not exactly at that temperature. On the other hand, if we were using $P_1$ to correct the second loop, then during interval 907 the microprocessor would detect a negative correlation between the temperature and the return power $P_1$. This would cause the microprocessor to reduce the average heater drive $P_{HT}$ in order to reach a point where the $P_1$ is maximized. Interval 904, where the temperature is reduced, exhibits higher average $P_1$ value, but also shows an onset of saturation at the top of the near-sinusoidal signal indicating that the temperature setting $T_{GMC}$ is close to the maximal value of $P_1$, namely, close to the GMC temperature that sets the longitudinal mode of the Fabry-Perot laser exactly at the center of the AWG passband.

FIG. 9 illustrates the behavior of the measured quantities used in the second control loop for tuning the GMC modes in a self-seeded system. The approach was described for both the embodiment in which the second loop searches for the extremum or a specific slope in the laser drive current, and the for the embodiment in which the second loop searches for the extremum in the return optical power $P_1$. For BLS-seeded systems, the method is analogous except that the loop searches for the minimum in the outgoing optical power $P_2$.

It is clear that control loops that find and maintain the response at a predetermined slope can be implemented in multiple ways. Therefore, the presented approach using digital control loop and dithering the temperature is one non-limiting example of the first and second control loops managed using one microprocessor. Present-day laser driver circuits generally include an analog loop for adjusting the laser output based on the current from the monitor photodiode. In one embodiment, the laser driver includes the automatic output-power control, while a microprocessor/controller manages the second control loop, namely, adjusts the temperature and finds the slope in the response function: the laser drive current $I_{LD}$ or the optical powers $P_1$ or $P_2$.

The invention claimed is:

1. An apparatus, comprising:
an optical transmitter comprising:
 a Fabry-Perot laser diode having a front facet light beam and back facet light beam, said back facet light beam having a back-facet light intensity that is dependent on a temperature of said Fabry-Perot laser diode;
 a back-monitor photodiode optically coupled to said Fabry-Perot laser diode and configured to deliver a back-monitor photodiode current in proportion to said back-facet light intensity; and
 an output port;
an optical coupler having at least three ports including a first port optically coupled to said output port;
an incident-monitor photodiode optically coupled to a second port of said optical coupler, said incident-monitor photodiode being operatively configured to capture a portion of said front-facet light beam and provide incident-monitor photodiode current in proportion to an intensity of said captured portion of said front-facet light beam;
a segment of optical fiber optically coupled to a third port of said optical coupler, said segment of optical fiber being operatively configured to deliver a narrowband injection light beam with a peak wavelength into a third port of said optical coupler; and
one or more controllers operatively configured to control said Fabry-Perot laser diode to maintain said back-monitor photodiode current at a preset value, and to adjust said temperature of said Fabry-Perot laser diode to maintain said intensity of said captured portion of said front-facet light beam at a local minimum in an intensity versus temperature characteristic.

2. The apparatus of claim 1, further comprising:
a broadband light source coupled to a narrowband optical filter optically coupled to said segment of optical fiber, said broadband light source and said narrowband optical filter being operatively configured to provide said narrowband injection light to said optical coupler.

3. The apparatus of claim 1, further comprising:
a narrowband optical filter optically coupled to said segment of optical fiber, said narrowband optical filter being operatively configured to provide said narrowband injection light to said optical coupler; and
a Faraday rotating mirror optically coupled to said narrowband optical filter through said optical coupler.

4. An apparatus, comprising:
an optical transmitter comprising:
 a Fabry-Perot laser diode having a front-facet beam and a back-facet beam, said back-facet beam having a back-facet intensity that is dependent on a temperature of said Fabry-Perot laser diode;
 a back-monitor photodiode optically coupled to said Fabry-Perot laser diode and configured to deliver a back-monitor photodiode current in proportion to said back-facet intensity; and
 an output port;
an optical coupler having at least three ports, including a first port optically coupled to said output port;
a segment of optical fiber optically coupled to a second port of said optical coupler, said segment of optical fiber being operatively configured to deliver a narrowband injection light with a peak wavelength and an injected-light intensity into said second port of said optical coupler;
an incident-monitor photodiode optically coupled to a third port of said optical coupler, said incident-monitor photodiode operatively configured to detect a fraction of said narrow-band injected light and provide incident-monitor photodiode current in proportion to said injected-light intensity; and
one or more one controllers operatively configured to control said Fabry-Perot laser diode to maintain said back-monitor photodiode current at a preset value, and adjust said temperature of said Fabry-Perot laser diode to maintain said injected-light intensity at a local maximum in an injected-light intensity versus temperature characteristic.

5. The apparatus of claim 4, further comprising a narrowband optical filter optically coupled to said segment of optical fiber.

6. The apparatus of claim 5, further comprising a modulation averaging reflector coupled to said narrowband optical filter and operatively configured to reflect a portion of light passed through said narrowband optical filter after emission from said Fabry-Perot laser diode.

7. The apparatus of claim 4, further comprising:
a narrowband optical filter optically coupled to said segment of optical fiber; and a Faraday rotating mirror operatively configured to reflect a portion of light passed through said narrowband optical filter after emission from said Fabry-Perot laser diode.

* * * * *